United States Patent
Amano et al.

(10) Patent No.: US 9,532,109 B2
(45) Date of Patent: Dec. 27, 2016

(54) SYSTEM AND METHOD FOR PROVIDING PRODUCT INFORMATION OF A PRODUCT VIEWED IN A VIDEO

(71) Applicant: Panasonic Intellectual Property Corporation of America, Torrance, CA (US)

(72) Inventors: Hiroshi Amano, Osaka (JP); Toshihisa Nakano, Osaka (JP); Takahiro Yamaguchi, Osaka (JP); Takashi Morimoto, Osaka (JP); Motoji Ohmori, Osaka (JP); Takako Hirose, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/566,748

(22) Filed: Dec. 11, 2014

(65) Prior Publication Data
US 2015/0181303 A1   Jun. 25, 2015

(30) Foreign Application Priority Data
Dec. 20, 2013 (JP) .................................. 2013-263832

(51) Int. Cl.
*H04N 21/478* (2011.01)
*H04N 21/24* (2011.01)
(Continued)

(52) U.S. Cl.
CPC .... *H04N 21/47815* (2013.01); *H04N 21/2408* (2013.01); *H04N 21/2543* (2013.01);
(Continued)

(58) Field of Classification Search
CPC ..................... H04N 21/47815; H04N 21/4782; H04N 21/422; H04N 21/475
See application file for complete search history.

(56) References Cited

U.S. PATENT DOCUMENTS 8,434,113 B1 * 4/2013 Taymor ............. G06Q 30/0253
725/51
2002/0169709 A1   11/2002   Kitayama
(Continued)

FOREIGN PATENT DOCUMENTS

JP   2002-312634   10/2002

*Primary Examiner* — Pankaj Kumar
*Assistant Examiner* — Alexander Boyd
(74) *Attorney, Agent, or Firm* — Greenblum & Bernstein, P.L.C.

(57) ABSTRACT

An information providing method includes: identifying a product in which a viewer expressed interest, by using an input notification; counting the number of viewers who expressed interest in each product, by using a result of the identifying; obtaining an offered price for each product of a product provider, the price corresponding to the number of viewers counted in the counting, and registering the price as product provider information; selecting a product provider that offers the identified product to the viewer, by using product provider information of one or more product providers that wish to provide one or more products; and causing the viewer's terminal apparatus to present the product provider information of the selected product provider and product information of the identified product in an associated manner. In the selecting, the product provider is selected based on the offered price of the identified product and the number of viewers.

14 Claims, 31 Drawing Sheets

(51) Int. Cl.
*H04N 21/2543* (2011.01)
*H04N 21/422* (2011.01)
*H04N 21/475* (2011.01)
*H04N 21/658* (2011.01)

(52) U.S. Cl.
CPC ......... *H04N 21/422* (2013.01); *H04N 21/475* (2013.01); *H04N 21/658* (2013.01)

(56) References Cited

U.S. PATENT DOCUMENTS

| | | | | |
|---|---|---|---|---|
| 2003/0154492 A1* | 8/2003 | Falvo | ................. | H04N 21/4126 725/113 |
| 2006/0041478 A1* | 2/2006 | Zheng | ................... | G06Q 30/02 705/14.56 |
| 2006/0293971 A1* | 12/2006 | Hunter | ............... | G06Q 10/0637 705/26.1 |
| 2009/0125414 A1* | 5/2009 | Kleinrock | .......... | G06Q 30/0283 705/26.1 |
| 2010/0146546 A1* | 6/2010 | Nishimura | ......... | H04N 21/4524 725/39 |
| 2010/0153831 A1* | 6/2010 | Beaton | ................... | G06Q 30/02 715/201 |
| 2010/0161437 A1* | 6/2010 | Pandey | ............. | G06Q 30/0601 705/26.1 |
| 2011/0099082 A1* | 4/2011 | Walker | .................. | G06Q 30/00 705/26.8 |
| 2011/0162002 A1* | 6/2011 | Jones | ............... | H04N 21/47815 725/32 |
| 2011/0306368 A1* | 12/2011 | McCarthy | ........ | H04N 21/47815 725/131 |
| 2012/0095819 A1* | 4/2012 | Li | ......................... | G06Q 30/02 705/14.23 |
| 2013/0179258 A1* | 7/2013 | Moskos | ............. | G06Q 30/0605 705/14.49 |
| 2013/0311315 A1* | 11/2013 | Zises | ................. | G06Q 30/0605 705/26.2 |
| 2014/0201004 A1* | 7/2014 | Parundekar | ........ | G06Q 30/0265 705/14.62 |
| 2015/0006278 A1* | 1/2015 | Di Censo | .......... | G06K 9/00845 705/14.43 |

* cited by examiner

FIG. 7

PRODUCT PROVIDER INFORMATION TABLE

| PRODUCT NAME | PRODUCT FIELD | PRODUCT NUMBER | PRODUCT PROVIDER | PRICE |
|---|---|---|---|---|
| QQ WASHING MACHINE | WASHING MACHINE | A-FR1234 | COMPANY A | DEPRESSION COUNT : PRICE<br>0 TO 10,000 : 100,000<br>10,000 TO 100,000 : 90,000<br>100,000 OR MORE : 80,000 |
| QQ WASHING MACHINE | WASHING MACHINE | A-FR1234 | COMPANY B | DEPRESSION COUNT : PRICE<br>0 TO 10,000 : 100,100<br>10,000 TO 100,000 : 90,100<br>100,000 OR MORE : 80,100 |
| PP JUICE | JUICE | B-LSX456h | COMPANY A | DEPRESSION COUNT : PRICE<br>0 TO 10,000 : 120<br>10,000 TO 100,000 : 110<br>100,000 OR MORE : 100 |
| PP JUICE | JUICE | B-LSX456h | COMPANY B | DEPRESSION COUNT : PRICE<br>0 TO 10,000 : 100<br>10,000 TO 100,000 : 90<br>100,000 OR MORE : 50 |
| ... | ... | ... | ... | ... |

FIG. 8

LOCATION INFORMATION TABLE

| PRODUCT PROVIDER | URL | PRODUCT PROVIDING PLACE | ADDRESS OF ACTUAL STORE |
|---|---|---|---|
| COMPANY A | WWW.AAA.co.jp | STORE AA (XAA, YAA),<br>STORE AB (XAB, YAB), ... | STORE AA: XX CITY XX TOWN,<br>STORE AB: XY CITY YZ TOWN, ... |
| COMPANY B | WWW.BBB.co.jp | STORE BA (XBA, YBA),<br>STORE BB (XBB, YBB), ... | ... |
| COMPANY C | WWW.CCC.co.jp | STORE CA (XCA, YCA),<br>STORE CB (XCB, YCB), ... | ... |
| ... | ... | ... | |

FIG. 9

BIDDING DISPLAY SCREEN

| PRODUCT PROVIDER | PRODUCT FIELD | PRODUCT NAME | PRODUCT NUMBER | DEPRESSION COUNT | LOWEST PRICE |
|---|---|---|---|---|---|
| COMPANY A | WASHING MACHINE | QQ WASHING MACHINE | A-FR1234 | 3,452,341 | 100,000 YEN |
| COMPANY B | JUICE | PP JUICE | B-LSX46h | 93,452,341 | 50 YEN |
| COMPANY C | COSMETICS | RR EYEBROW PENCIL | C-CFT-798 | 53,452,341 | 3,000 YEN |
| ... | ... | ... | ... | ... | ... |

FIG. 10

VIEWER INFORMATION TABLE

| VIEWER NAME | COMMUNICATION ADDRESS OF VIDEO PRESENTING APPARATUS | COMMUNICATION ADDRESS OF PORTABLE TERMINAL | COMMUNICATION ADDRESS OF NAVIGATION APPARATUS |
|---|---|---|---|
| Mr. X | XXXX | YYYY | ZZZZ |
| Ms. Y | XXZZ | YYZZ | ZZXX |
| ... | ... | ... | ... |

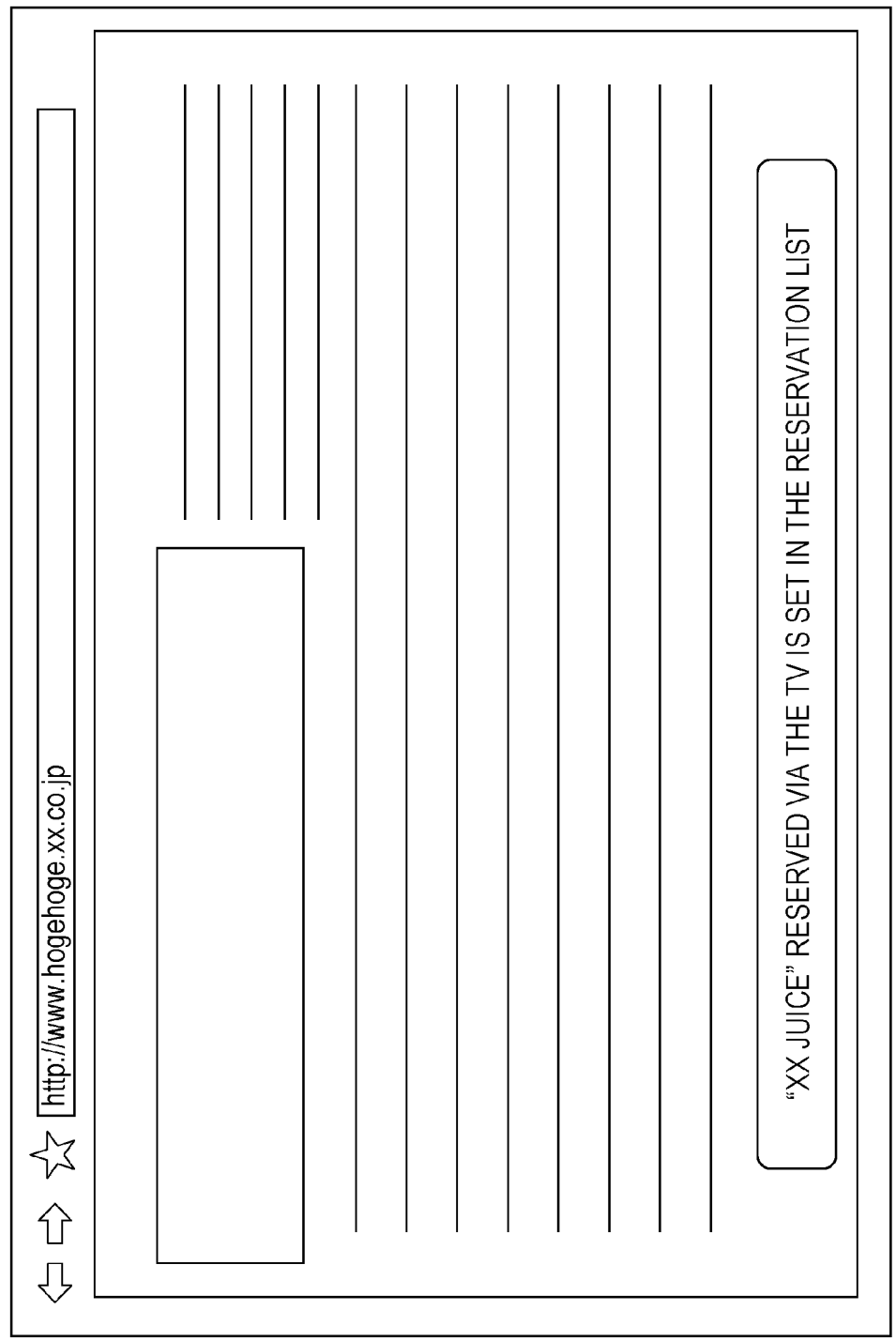

FIG. 19

RESERVATION LIST

XX JUICE — REGISTRATION DATE AND TIME: 2013/10/15 20:15:32
REGISTRATION PROGRAM: xx VARIETY (CH 8)
RESERVATION PRICE: xxx YEN PER CAN
TOTAL OF 5,345,341 PEOPLE CURRENTLY WANT THIS XX LIPSTICK — REGISTRATION DATE AND TIME: 2013/10/16 21:30:30
REGISTRATION PROGRAM: xx DRAMA (CH 8)
RESERVATION PRICE: xxx YEN PER PIECE
TOTAL OF 1,325,341 PEOPLE CURRENTLY WANT THIS YY TELEVISION — REGISTRATION DATE AND TIME: 2013/10/16 22:30:30
REGISTRATION PROGRAM: xx NEWS (CH 8)
RESERVATION PRICE: xxxxx YEN PER UNIT
TOTAL OF 452,341 PEOPLE CURRENTLY WANT THIS ZZ DETERGENT — REGISTRATION DATE AND TIME: 2013/10/17 08:30:30
REGISTRATION PROGRAM: xx NEWS REPORT (CH 2)
RESERVATION PRICE: xxx YEN PER PIECE
TOTAL OF 9,452,341 PEOPLE CURRENTLY WANT THIS http://www.hogehoge.xx.co.jp 2601
2602

FIG. 31

BIDDING DISPLAY SCREEN

| PRODUCT PROVIDER | PRODUCT FIELD | PRODUCT NAME | PRODUCT NUMBER | DISTANCE FROM STORE | DEPRESSION COUNT | LOWEST PRICE |
|---|---|---|---|---|---|---|
| COMPANY A | WASHING MACHINE | QQ WASHING MACHINE | A-FR1234 | 1 km OR LESS | 41 | 175,000 YEN |
| | | | | 1 TO 2 km | 341 | 137,000 YEN |
| | | | | 2 km OR MORE | 452,341 | 128,000 YEN |
| COMPANY B | JUICE | PP JUICE | B-LSX456h | 1 km OR LESS | 341 | 51 YEN |
| | | | | 1 TO 2 km | 2,341 | 48 YEN |
| | | | | 2 km OR MORE | 3,452,341 | 42 YEN |
| COMPANY C | COSMETICS | RR EYEBROW PENCIL | C-CFT-798 | 1 km OR LESS | 234 | 3,100 YEN |
| | | | | 1 TO 2 km | 5,432 | 2,700 YEN |
| | | | | 2 km OR MORE | 1,252,348 | 2,000 YEN |
| ... | ... | ... | ... | | | ... |

SYSTEM AND METHOD FOR PROVIDING PRODUCT INFORMATION OF A PRODUCT VIEWED IN A VIDEO

CROSS REFERENCES TO RELATED APPLICATIONS

This Application claims priority to Japanese Patent Application No. 2013-263832, filed on Dec. 20, 2013, the contents of which are hereby incorporated by reference.

BACKGROUND

1. Technical Field

The present disclosure relates to a technology that provides information to a viewer of a video presenting apparatus.

2. Description of the Related Art

In recent years, various services have been provided to viewers of video presenting apparatuses, such as televisions, over networks. Japanese Unexamined Patent Application Publication No. 2002-312634 disclose a technology in which a broadcast station, which serves as a bidding host, notifies bidders about bidding of an advertising spot, the bidders send bid prices for the advertising spot, the bidding host discloses a bidding status to the bidders, and the bidding host determines a winning bidder of the advertising spot on the basis of the bid prices.

SUMMARY

An information providing method according to one mode of the present disclosure is directed to an information providing method for an information providing system that provides information to a viewer of a video presenting apparatus that obtains broadcast waves and that presents video. The method includes: receiving an input notification indicating an interest instruction input by the viewer when video including product information in which the viewer expressed interest was presented on the video presenting apparatus; identifying a product in which the viewer expressed interest, by using the input notification; counting the number of viewers who expressed interest in the product, by using a result of the identifying; obtaining an offered price for the identified product of a product provider, the offered price corresponding to the number of viewers counted in the counting, and registering provider information including the offered price; selecting a product provider that offers the identified product to the viewer, by using the product provider information of each of one or more product providers that wish to provide the identified product; and causing a terminal apparatus of the viewer to present the product provider information of the selected product provider and the product information of the identified product in an associated manner. In the selecting, the product provider is selected based on the offered price of the identified product and the number of viewers.

These comprehensive and specific aspects may be realized by a system, an apparatus, a device, a method, and a computer program or may be realized by any combination of a system, an apparatus, a device, a method, and a computer program.

According to the above-described mode, when the viewer of the video presenting apparatus inputs an interest instruction for a product displayed on the video presenting apparatus, the product information of the product can be quickly presented.

BRIEF DESCRIPTION OF THE DRAWINGS

FIG. 7 illustrates one example of the data structure of a product provider information table;

FIG. 8 illustrates one example of the data structure of a location information table;

FIG. 9 illustrates one example of a bidding display screen;

FIG. 10 illustrates one example of the data structure of a viewer information table;

FIG. 18 is a view of one example of the display screen of the terminal apparatus which displays a reservation notification;

FIG. 19 is a view of one example of a reservation-list display screen displayed by the terminal apparatus when the viewer inputs a reservation-list display instruction;

FIG. 31 is a table illustrating one example of a bidding display screen considering a distance condition.

DETAILED DESCRIPTION

Figure 1:
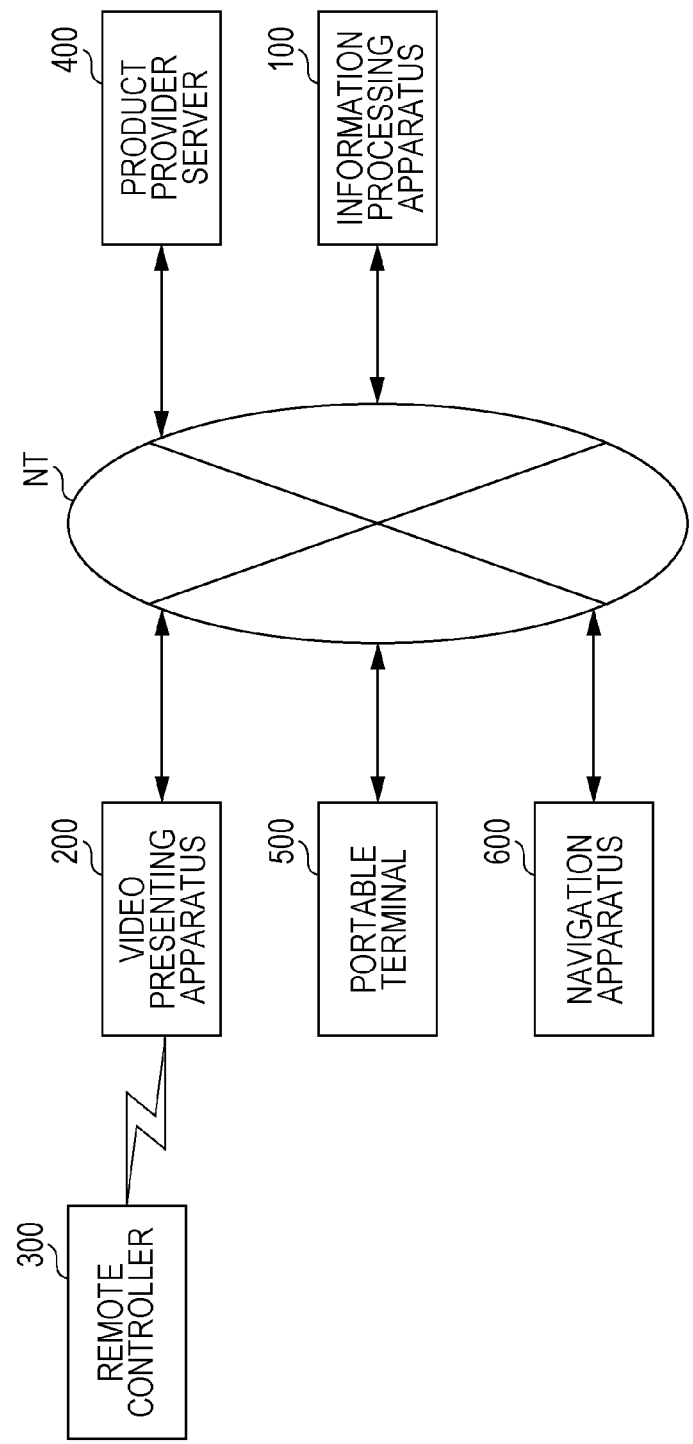
FIG. 1 is a diagram illustrating one example of the overall configuration of an information providing system that realizes an information providing method according to a first embodiment.

First, a description will be given of points the present inventors have studied to invent each mode according to the present disclosure.

Background that Led to Inventing Modes According to Present Disclosure

Various commercials and programs are broadcast on televisions, and viewers may want to immediately purchase products introduced in the commercials or programs. However, the currently available televisions have a problem in that, even when the viewers want the introduced products, they cannot purchase the products immediately.

In recent years, product providing sites from which products can be purchased over the Internet are operated, and the viewer can purchase products over the Internet without visiting actual stores. In this case, however, the viewers have to perform work involving launching browsers for the Internet to access the product providing sites and searching for desired products. Thus, there are problems in that there is no immediacy and workload is placed on the viewers.

Also, viewers have desires to purchase products they want at lower prices, and in order to realize this, for example, the viewers have to check the prices of the products over the Internet or by actually going to actual stores, which place great burdens on the viewers. Because of the burdens, some of the viewers may give up the purchase of the products.

Meanwhile, the operators of the product providing sites wish to increase, as much as possible, the opportunities in which consumers who have high willingness to purchase access their product providing sites. The operators of the product providing sites also want a large number of consumers to buy their products.

However, currently, any measures that meet such a desire of the operators of product providing sites have not been taken for the Internet and televisions.

Also, in recent years, the number of viewers of television broadcast has been on a declining trend because of the advent of the Internet and so on, and correspondingly, the effect of television commercials decreases, and the number of corporations that request television commercials is decreasing. Accordingly, in the broadcast industry, how to acquire corporations that request television commercials has been a problem.

In Japanese Unexamined Patent Application Publication No. 2002-312634, an advertising spot is merely determined through a bidding using a network, and the above-described problem cannot be overcome.

A mode that is conceivable in order to address the above-described problem is that, for example, a server that provides various services is connected to a television through the Internet, and when a viewer depresses a product purchase button during broadcast of a commercial, the server detects the depression and connects the television to a product providing site.

In this mode, however, since the number of televisions that have been around is enormous, individual viewers would depress the product purchase buttons at arbitrary timings through the enormous number of televisions. Thus, it is not easy to connect the televisions to the product providing sites with low latency from when the viewers depress the product purchase buttons. Also, the viewers generally wish to purchase a product at the lowest price, but when this factor is taken into account and the server determines a product providing site and connects a television to the product providing site, the latency increases further. In addition, the product providers may want to offer a product in high demand at a discounted price, but when this factor is also taken into account and the server determines a product providing site and connects a television to the product providing site, the latency increases further.

The present disclosure provides an information providing method that can quickly present, when a viewer of a video presenting apparatus inputs an interest instruction for a product displayed on the video presenting apparatus, product information of a product to the viewer.

An information providing method according to one mode of the present disclosure is directed to an information providing method for an information providing system that provides information to a viewer of a video presenting apparatus that obtains broadcast waves and that presents video. The method includes: receiving an input notification indicating an interest instruction input by the viewer when video including product information in which the viewer expressed interest was presented on the video presenting apparatus; identifying a product in which the viewer expressed interest, by using the input notification; counting the number of viewers who expressed interest in the product, by using a result of the identifying; obtaining an offered price for the identified product of a product provider, the offered price corresponding to the number of viewers counted in the counting, and registering product provider information including the offered price; selecting a product provider that offers the identified product to the viewer, by using the product provider information of each of one or more product providers that wish to provide the identified product; and causing a terminal apparatus of the viewer to present the product provider information of the selected product provider and the product information of the identified product in an associated manner. In the selecting, the product provider is selected based on the offered price of the identified product and the number of viewers.

In this case, when the viewer who watches video on the video presenting apparatus inputs an interest instruction, an input notification indicating the interest instruction is used to identify a product in which the viewer expressed interest, and the product provider information of each of one or more product providers that wish to offer the identified product is used to select a product provider. In the selecting, the product provider is selected based on the offered price of the identified product and the number of viewers. Accordingly, with respect to an interest instruction that the viewer inputs at an arbitrary timing, the product information of a product in which the viewer is interested and the product provider information of a product provider that offers the product can be presented to the viewer with low latency. Also, when a product in which the viewer is interested is presented on the video presenting apparatus while he or she is viewing/listening to video thereon, the viewer can immediately browse the product information and the product provider information for the product by merely inputting an interest instruction. Thus, it is possible to more effectively enhance the viewer's willingness to purchase a product in which he or she is interested. As a result, the product provider can provide products to a larger number of viewers. Also, when this arrangement is applied to a commercial presented on the video presenting apparatus, it is possible to enhance the viewers' willingness to purchase a product in the commercial. As a result, the effect of the commercial is more reliably increased, so that the advertising revenue of a broadcast operator can be increased.

Also, in the above-described mode, in the selecting, a product provider that offers the identified product at the lowest price may be selected from one or more product providers that offer the identified product.

In this case, a product provider that offers, at the lowest price, the product in which the viewer expressed interest can be quickly presented to the viewer.

Also, in the above-described mode, a server of the each of one or more product providers may present the counted number of viewers for the identified product.

In this case, since the number of viewers who expressed interest in the identified product is presented to the product provider, a decision material for setting the price of the identified product based on the number of viewers can be presented to the product provider. Thus, for example, the product provider can win a bidding by taking measures, such as reducing the price, for a product in high demand.

In the above-described mode, location information indicating, in real space, one or more product providing places of the one or more product providers and the product provider information of the one or more product providers may be associated with each other, the information providing method further comprising: identifying a location of the video presenting apparatus or the viewer in the real space, wherein in the selecting, those product providers for the product who provide places where a distance from the identified location is within a certain distance range may be extracted using the product provider information, and the product provider may be selected from the extracted product providers.

In this configuration, when a mode in which a place where a product in which the viewer expresses interest is provided in real space is presented to the viewer is used, it is possible to prevent selection of a product provider whose product providing place is away from the current location of the viewer or the video presenting apparatus. As a result, it is possible to prevent occurrence of a viewer who gives up purchase because the product providing place is far away from, for example, home, although the product providing place is presented to the viewer.

Also, in the above-described mode, the received input notification may further include a distance range to the product providing place, the distance range being input by the viewer, and wherein in the selecting, the product providers within the distance range may be extracted using the product provider information.

In this case, it is possible to select a product provider whose product providing place is located within a distance range where the viewer thinks he or she can come to shop. As a result, the viewer can easily visit the product providing place.

Also, in the above-described mode, the terminal apparatus of the viewer may be the video presenting apparatus, and the product provider information may include location information indicating, in a communications network, a location of a product providing site via which the product provider allows the viewer to purchase the product. In addition, in the presenting, presentation information for causing the video presenting apparatus to present the product provider information of the selected product provider and the product information of the identified product in an associated manner may be transmitted, and the video presenting apparatus may receive the presentation information and use location information included therein to access the product providing site.

In this case, since the location information of the product providing site in the communications network is transmitted to the video presenting apparatus, the video presenting apparatus can access the product providing site by specifying the location information.

The terminal apparatus of the viewer may be a navigation apparatus, and the product provider information may include location information indicating, in real space, a product providing place of the product provider. In addition, in the presenting, presentation information for causing the navigation apparatus to present the product provider information of the selected product provider and the product information of the identified product in an associated manner may be transmitted, and the navigation apparatus may set, as a destination, a location that exists in the real space and that is indicated by location information included in the presentation information.

In this case, the location information of the product providing place of the product provider is automatically set for the navigation apparatus as a destination, even without the viewer inputting the location information to the navigation apparatus. Thus, the viewer can easily go to the product providing place by driving a vehicle.

In the mode described above, the offered price may include a value that differs depending on the number of viewers who have expressed interest in each product; and in the selecting, a product provider that presents a lowest offered price with respect to the counted number of viewers may be selected as the product provider.

In this case, an offered price having a value that differs depending on the number of viewers who have expressed interest in each product is pre-registered in the product provider information. Accordingly, it is possible to quickly select a product provider that presents the lowest offered price with respect to the actual number of inputs of interest instructions for a corresponding product.

In the above-described mode, the information providing method further comprising: constantly receiving broadcast waves of one or more channels. In addition, in the identifying, channel information of a broadcast wave received by the video presenting apparatus may be obtained when the interest instruction was input, and a product, in which the viewer expresses interest, may be identified by using the obtained channel information and the received broadcast wave and using video presented on the video presenting apparatus when the interest instruction was input.

In this case, since broadcast waves of one or more channels are received constantly and the input notification includes channel information, broadcast-wave video, which the viewer was watching, can be identified when he or she input the interest instruction, by using the input notification transmitted from the video presenting apparatus. A product in which the viewer is interested can be identified based on the identified video. As a result, it is possible to reliably identify a product in which the viewer is interested.

In the above-described mode, the video presenting apparatus or the terminal apparatus may receive an interest instruction input by the viewer when video including product information in which the viewer expressed interest was presented on the video presenting apparatus; and the input notification may be received from the video presenting apparatus or the terminal apparatus that has received the interest instruction.

In the above-described mode, at least one of the receiving, the identifying, the counting, the registering, the selecting and the causing may be performed by a processor.

A terminal apparatus according to the present disclosure is directed to a terminal apparatus used in an information providing system including an information processing apparatus that provides information to a viewer of a video presenting apparatus that obtains broadcast waves and that presents video. The terminal apparatus includes: an operation unit that receives an interest instruction input by a viewer when video including product information in which the viewer expressed interest was presented; a transmitting unit that transmits an input notification of the interest instruction to the information processing apparatus; a receiving unit that receives, from the information processing apparatus, product information of a product in which the viewer expressed interest and product provider information of a product provider that offers the product; and a display processing unit that causes a display unit to display the received product information and the received product provider information, by the receiving unit, in an associated manner.

In this case, it is possible to provide a terminal apparatus on which the product information of a product and the product provider information of a product provider that offers the product are displayed in an associated manner, when the viewer who watches video presented on the video presenting apparatus is interested in the product included in the video and inputs an interest instruction.

In the above-described mode, the information processing apparatus may obtain channel information of broadcast waves, received by the video presenting apparatus, from the video presenting apparatus through a communications network; the terminal apparatus may be connected to the information processing apparatus through the communications network; the receiving unit may receive, from the information processing apparatus, the channel information of a channel received by the video presenting apparatus; and the transmitting unit may insert the received channel information into the input notification and transmits resulting input notification to the information processing apparatus.

In this case, the terminal apparatus can obtain the channel information of the video presenting apparatus without direct communication between the terminal apparatus and the video presenting apparatus. Thus, it is possible to increase the number of video presenting apparatuses that can be applied to the information providing system, without providing the video presenting apparatus with a communication circuit for communicating with the portable terminal.

A control method according to the present disclosure is directed to a control method for a terminal apparatus in an information providing system including an information processing apparatus that provides information to a viewer of a video presenting apparatus that obtains broadcast waves and that presents video. The control method causes a computer of the terminal apparatus to execute: receiving an interest instruction input by a viewer when video including product information in which the viewer expressed an interest was presented; transmitting an input notification indicating the interest instruction to the information processing apparatus; receiving, from the information processing apparatus, product information of a product in which the viewer expressed interest and product provider information of a product provider that offers the product; and causing a display unit to display the received product information and the received product provider information in an associated manner.

In this case, it is possible to provide a terminal apparatus on which the product information of a product and the product provider information of a product provider that offers the product are displayed in an associated manner, when the viewer who watches video presented on the video presenting apparatus is interested in the product included in the video and inputs an interest instruction.

A recording medium according to the present disclosure is directed to a computer-readable non-transitory tangible recording medium recording a program executed by a terminal apparatus used in an information providing system including an information processing apparatus that provides information to a viewer of a video presenting apparatus that obtains broadcast waves and that presents video. The program causes a computer of the terminal apparatus to execute: receiving an interest instruction input by a viewer when video including product information in which the viewer expressed interest was presented; transmitting an input notification of the interest instruction to the information processing apparatus; receiving, from the information processing apparatus, product information of a product in which the viewer expressed interest and product provider information of a product provider that offers the product; and causing a display unit to display the received product information and the received product provider information in an associated manner.

In this case, it is possible to provide a terminal apparatus on which the product information of a product and the product provider information of a product provider that offers the product are displayed in an associated manner, when the viewer who watches video presented on the video presenting apparatus is interested in the product included in the video and inputs an interest instruction.

An information providing system according to the present disclosure is directed to an information providing system that includes a terminal apparatus and an information processing apparatus that provides information to a viewer of a video presenting apparatus that obtains broadcast waves and that presents video. The information processing apparatus: receives an input notification indicating an interest instruction input by the viewer when video including product information in which the viewer expressed interest was presented on the video presenting apparatus; identifies a product in which the viewer expressed interest, by using the input notification; and counts the number of viewers who expressed interest in the product, by using a result of the identifying. The information processing apparatus further obtains an offered price for the identified product of a product provider, the offered price corresponding to the number of viewers counted in the counting, and registers product provider information including the offered price. The information processing apparatus further selects a product provider that offers the identified product to the viewer, by using product provider information of each of one or more product providers that wish to provide the identified product, and the product provider is selected, in the selecting, based on the offered price for the identified product and the number of viewers. The terminal apparatus presents the product provider information of the selected product provider and the product information of the identified product in an associated manner.

In this case, when the viewer who watches video on the video presenting apparatus inputs an interest instruction, an input notification indicating the interest instruction is used to identify a product in which the viewer expressed interest, and the product provider information of each of one or more product providers that wish to offer the identified product is used to select a product provider. In the selecting, the product provider is selected based on the offered price of the identified product and the number of viewers. Accordingly, with respect to an interest instruction that the viewer inputs at an arbitrary timing, the product information of a product in which the viewer is interested and the product provider information of a product provider that offers the product can be presented to the viewer with low latency. Also, when a product in which the viewer is interested is presented on the video presenting apparatus while he or she is viewing/listening to video thereon, the viewer can immediately browse the product information and the product provider information for the product by merely inputting an interest instruction. Thus, it is possible to more effectively enhance the viewer's willingness to purchase a product in which he or she is interested. As a result, the product provider can provide products to a larger number of viewers. Also, when this mode is applied to a commercial presented on the video presenting apparatus, it is possible to enhance the viewers' willingness to purchase a product in the commercial. As a result, the effect of the commercial is more reliably increased, so that the advertising revenue of a broadcast operator can be increased. In addition, it is possible to provide a terminal apparatus on which the product information of a product and the product provider information of a product provider that offers the product are displayed in an associated manner, when the viewer who watches video presented on the video presenting apparatus is interested in the product included in the video and inputs an interest instruction.

First Embodiment

FIG. 1 is a diagram illustrating one example of the overall configuration of an information providing system that realizes an information providing method according to a first embodiment.

The information providing system illustrated in FIG. 1 includes an information processing apparatus 100, a video presenting apparatus 200, a remote controller 300, a product provider server apparatus 400 (hereafter, referred to as a product provider server 400), a portable terminal 500, and a navigation apparatus 600.

The information processing apparatus 100, the video presenting apparatus 200, the product provider server 400, the portable terminal 500, and the navigation apparatus 600 are connected through a communications network NT so as to allow mutual communication. The communications network NT may be, for example, the Internet.

Thus, the information processing apparatus 100, the video presenting apparatus 200, the product provider server 400, the portable terminal 500, and the navigation apparatus 600 each transmit/receive various types of data by using a communication protocol, such as Transmission Control Protocol/Internet Protocol (TCP/IP).

The information processing apparatus 100 is implemented by, for example, a server that provides various services to the video presenting apparatus 200. In the present embodiment, the information processing apparatus 100 receives, for example, an input notification indicating an interest instruction input by a viewer from the video presenting apparatus 200 and identifies a product included in video presented on the video presenting apparatus 200 when the interest instruction was input. The information processing apparatus 100 then selects, for example, a product provider that offers the specified product to the viewer and causes the video presenting apparatus 200 to present product provider information regarding the selected product provider and product information in an associated manner.

The video presenting apparatus 200 is implemented by, for example, a television that obtains broadcast waves and that presents video. In the present embodiment, for example, when the viewer inputs an interest instruction by using the remote controller 300, the video presenting apparatus 200 transmits, to the information processing apparatus 100, channel information indicating a broadcast wave channel presented when the interest instruction was input and the input time of the interest instruction. The video presenting apparatus 200 presents the product provider information and the product information, transmitted from the information processing apparatus 100, in an associated manner.

The remote controller 300 is a device for operating the video presenting apparatus 200 and uses, for example, infrared communication to transmit various commands to the video presenting apparatus 200. In the present embodiment, the remote controller 300 has, for example, an interest instruction button. When the viewer depresses the interest instruction button, the remote controller 300 transmits, to the video presenting apparatus 200, a command for notifying the video presenting apparatus 200 that the interest instruction button is depressed.

The portable terminal 500 is implemented by, for example, a smartphone, a tablet terminal, or a button-type mobile phone and is carried by the viewer. The navigation apparatus 600 is installed, for example, in a vehicle or on a bicycle owned by the viewer and guides the viewer to a destination set by the viewer.

Although only one video presenting apparatus 200 is illustrated in FIG. 1, two or more video presenting apparatuses 200 may be provided. Also, product provider servers 400 may also be provided for respective product providers that participate in the information providing system. Although only one portable terminal 500 and only one navigation apparatus 600 are illustrated, two or more may also be provided. Although the portable terminal 500 and the navigation apparatus 600 are illustrated in FIG. 1 as being physically independent from each other, there is no need to limit the configuration thereto. For example, the portable terminal 500 may have functions of the navigation apparatus 600.

Figure 2:
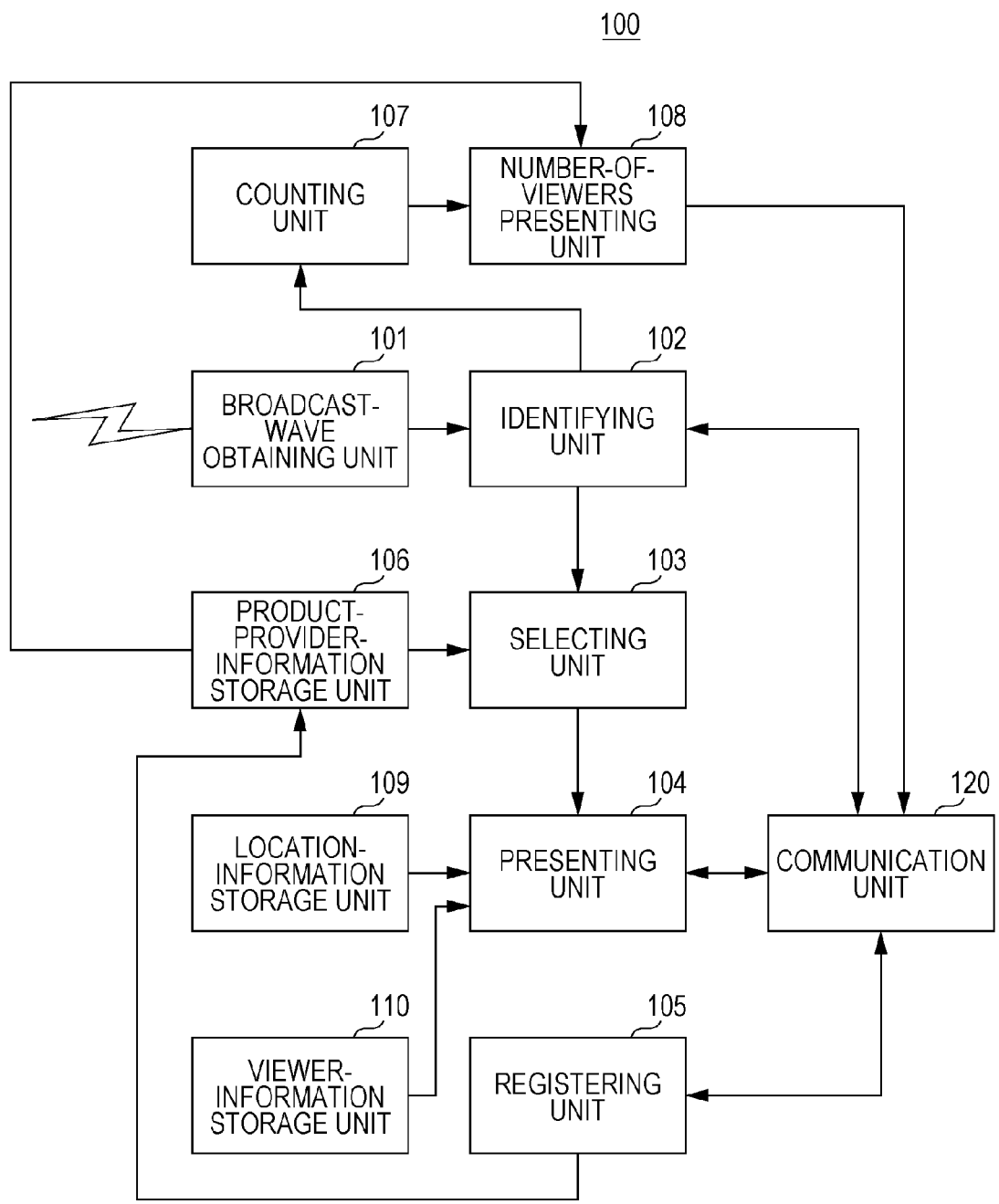
FIG. 2 is a block diagram illustrating one example of the functional configuration of the information processing apparatus illustrated in FIG. 1.

FIG. 2 is a block diagram illustrating one example of the functional configuration of the information processing apparatus 100 illustrated in FIG. 1. The information processing apparatus 100 is implemented by, for example, a computer including a central processing unit (CPU), a read only memory (ROM), a random access memory (RAM), and so on. The information processing apparatus 100 includes a broadcast-wave obtaining unit 101, an identifying unit 102, a selecting unit 103, a presenting unit 104, a registering unit 105, a product-provider-information storage unit 106, a counting unit 107, a number-of-viewers presenting unit 108, a location-information storage unit 109, a viewer-information storage unit 110, and a communication unit 120.

The broadcast-wave obtaining unit 101 includes, for example, a tuner and receives broadcast waves of all channels that are receivable by the video presenting apparatus 200. For example, when the video presenting apparatus 200 can receive broadcast waves of channels, such as CH 1, CH 3, CH 4, CH 6, CH 8, and CH 10, it simultaneously detects the broadcast waves of all of the channels and receives the respective broadcast waves of all of the channels. Examples of the broadcast waves include broadcast waves of digital terrestrial television and broadcast waves of satellite television. However, this is merely one example, and when the video presenting apparatus 200 can receive a program that is broadcast over the Internet, data of the program delivered over the Internet may be used as a broadcast wave.

When the communication unit 120 receives, from the video presenting apparatus 200, an input notification indicating that the viewer input an interest instruction, the identifying unit 102 uses the input notification to identify a product in which the viewer expressed interest.

In this case, the identifying unit 102 can identify a product by using the following four methods.

<Identifying Method 1>

Identifying method 1 is a scheme in which video presented by the video presenting apparatus 200 when an interest instruction is input is identified and an image recognition technology is used to identify a product in which a viewer expressed interest from the identified video. In this case, the input notification includes channel information for video presented by the video presenting apparatus 200 when an interest instruction is input and the input time of the interest instruction. By using the channel information included in the input notification, the identifying unit 102 identifies, of the broadcast waves obtained by the broadcast-wave obtaining unit 101, a broadcast wave of the channel the viewer was watching/listening to when the interest instruction was input. By using the input time included in the input notification, the identifying unit 102 identifies, of the video of the identified broadcast wave, video presented on the video presenting apparatus 200 when the viewer input the interest instruction.

In addition, the identifying unit 102 may identify a product included in the identified video, by using a database in which features of one or more images representing one or more products to be identified are pre-registered. The features of the image(s) representing the product(s) are predetermined using the image(s) in which the product(s) is displayed. The identifying unit 102 may sequentially execute pattern matching between each of the features registered in the database and the identified video and may identify a product having a largest correlation value as a product in which the viewer expressed interest.

The input notification may also include line-of-sight information indicating the viewer's line-of-sight. In this case, the identifying unit 102 may use the line-of-sight information to extract, in the identified video, an area to which the viewer pays attention and may sequentially execute pattern matching between the extracted area and each of the features registered in the database. This can reduce the amount of computation and can speed up the pattern matching, compared with a case in which pattern matching is performed on the entire area of one frame of video.

In the case in which the line-of-sight information is inserted into the input notification, when the viewer inputs an interest instruction, for example, the video presenting apparatus 200 irradiates the face of the viewer with infrared and captures an image of the face of the viewer with an infrared camera. The video presenting apparatus 200 may then detect the reflection position of the cornea and the position of the pupil of the viewer on the basis of the captured facial image and may identify the line-of-sight of the viewer on the basis of the positional relationship therebetween. The video presenting apparatus 200 may then insert, into an input notification as line-of-sight information, for example, the coordinates of four vertices of a quadrangle having a predetermined area at its center located at the intersection of the identified line-of-sight and a display unit of the video presenting apparatus 200.

<Identifying Method 2>

Identifying method 2 is a scheme in which a product in which a viewer expressed interest is identified by using a content database in which content IDs for identifying content including video and product information indicating products included in the content are pre-registered in association with each other. The content database is created, for example, when an operator watches/listens to content.

The operator may actually watch the video of content in advance to identify a product included in the video and may register product information of the identified product and a content ID in the content database in association with each other.

Herein, the content is mainly assumed to be television commercials, but is not limited thereto and may be a program (e.g., a drama or a program for introducing a product) broadcast by a broadcast operator. Examples of the content ID include a symbol string that can be recognized by a computer.

By using the created content database, the identifying unit 102 identifies a product in which the viewer is interested, for example, by performing the following, processing. First, upon obtaining an input notification of an interest instruction, the identifying unit 102 checks the channel information and the input time, included in the input notification, against a pre-acquired broadcast schedule to thereby identify content for which the viewer has input the interest instruction. The broadcast schedule includes data that indicates in which time slot particular content is broadcast by using a content ID.

By using the content ID of the identified content, the identifying unit 102 identifies, in the content database, the product information corresponding to the content ID and identifies, as a product in which the viewer is interested, a product indicated by the identified product information.

<Identifying Method 3>

Identifying method 3 is a method in which electronic watermark data indicating product information is pre-embedded in content including a product to be identified and is used to identify a product in which a viewer is interested.

In this method, a product in which a viewer is interested is identified, for example, by the following processing. First, a broadcast operator broadcasts content including video in which electronic watermark data indicating product information is embedded. When the viewer inputs an interest instruction, the video presenting apparatus 200 reads the electronic watermark data from the video presented on the video presenting apparatus 200 at this point to obtain the product information. The video presenting apparatus 200 then inserts the obtained product information into an input notification and transmits the resulting input notification to the information processing apparatus 100. Upon obtaining the input notification, the identifying unit 102 identifies, as a product in which the viewer is interested, a product indicated by the product information included in the input notification.

Alternatively, the product in which the viewer is interested may be identified by performing the following processing in which the video presenting apparatus 200 does not read code information. When the viewer inputs an interest instruction, the video presenting apparatus 200 inserts the channel information and the input time into the input notification and transmits the resulting input notification to the information processing apparatus 100. Upon obtaining the input notification, the identifying unit 102 identifies the video presented by the video presenting apparatus 200 when the interest instruction was input, by using a scheme that is the same as that in identifying method 1 on the basis of the channel information and the input time included in the input notification. The identifying unit 102 then reads the electronic watermark data from the identified video to extract the product information, thereby identifying the product in which the viewer is interested.

<Identifying Scheme 4>

Identifying scheme 4 is a method in which a code image of a barcode, Quick Response (QR) code (registered trademark), or the like indicating product information is added to content including a product to be identified and the added code image is used to identify a product in which the viewer is interested.

In this method, the product in which a viewer is interested is identified, for example, by the following processing. First, a broadcast operator broadcasts content to which a code image indicating product information is added. When the viewer inputs an interest instruction, the video presenting apparatus 200 reads the code image from the video presented on the video presenting apparatus 200 at the time of the input to thereby obtain the product information. The video presenting apparatus 200 then inserts the obtained product information into an input notification and transmits the resulting input notification to the information processing apparatus 100. Upon obtaining the input notification, the identifying unit 102 identifies, as a product in which the viewer is interested, a product indicated by the product information included in the input notification.

Alternatively, the product in which the viewer is interested may be identified by performing the following processing in which the video presenting apparatus 200 does not read code information. First, when the viewer inputs an interest instruction, the video presenting apparatus 200 inserts the channel information and the input time into an input notification and transmits the resulting input notification to the information processing apparatus 100. Upon obtaining the input notification, the identifying unit 102 identifies the video presented by the video presenting apparatus 200 when the interest instruction was input, by using a scheme that is the same as that in identifying method 1 on the basis of the channel information and the input time included in the input notification. The identifying unit 102 then reads the code image from the identified video to extract product information, thereby identifying a product in which the viewer is interested.

Next, a description will be given of advantages of identifying methods 1 to 4. In identifying methods 1 and 2, there is no need to modify content, thus providing advantages in that the operating company of the information processing apparatus 100 does not need to request the broadcast operator to modify the content and can implement the system in-house.

Also, in identifying methods 1 and 2, since there is no need to modify content, the design of the content is not affected.

In addition, in identifying method 3, although content is modified, the electronic watermark data cannot be recognized by the viewer, and thus the design of the content is not adversely affected.

In identifying methods 2 to 4, different product information can be embedded for the same content. Thus, for example, even for the same content, different product information can be embedded so as to correspond to a delivery path.

Also, in identifying methods 2 to 4, since a high-processing-load image processing technology, such as pattern matching, is not used, a product in which the viewer is interested can be quickly identified, even when an enormous number of products are to be identified.

Referring back to FIG. 2, the selecting unit 103 uses a product provider information table (see FIG. 7) in which one or more product providers that wish to provide one or more products are pre-registered is used to select a product provider that provides the viewer with the product identified by the identifying unit 102.

FIG. 7 illustrates one example of the data structure of the product provider information table. The product provider information table is a two-dimensional relational database pre-stored in the product-provider-information storage unit 106 and has fields for "product name", "product field", "product number", "product provider", and "price".

The "product name" is a product name that the manufacturer of a product has pre-given in order to identify the product. The "product field" indicates a product field to which the product belongs and is, for example, information for identifying a product type, such as a washing machine or juice. The "product number" is represented by, for example, a symbol string indicating the model number of a product and corresponds to the product name. That is, when the product number is known, the product name can be identified.

The "product provider" is, for example, the name of a retailer that sells products to viewers. The "price" indicates the sales price at which the product provider sells the product. In the example in FIG. 7, different prices have been set according to a depression count. The "depression count" is a cumulative value of the number of times viewers have input interest instructions.

For example, company A sells a QQ washing machine for 100,000 yen when the depression count therefor is in the range of 0 to 10,000 and sells it for 90,000 yen when the depression count is in the range of 10,000 to 100,000. Also, company B sells QQ washing machine for 100,100 yen when the depression count is in the range of 0 to 10,000 and sells it for 90,100 yen when the depression count is in the range of 10,000 to 100,000.

In such a manner, as the depression count increases, each product provider reduces the price. This is based on, for example, the idea that a product provider can offer consumers a lower price for a product that is expected to be sold in a larger quantity.

The items included in the product provider information table illustrated in FIG. 7 are examples, another item may also be added thereto, and the price corresponding to each depression count is also one example. Also, although the price is varied according to the depression count in the example in FIG. 7, this is merely one example, and the same price may also be applied regardless of the depression count.

When the identifying unit 102 identifies the product in which the viewer is interested and the number of inputs of interest instructions for the product, the selecting unit 103 selects, from the product provider information table, a product provider that sells the product at the lowest price with respect to the number of inputs (i.e., the depression count). For example, when the depression count for QQ washing machine is assumed to be 5,000, the price offered by company A is 100,000 yen, which is lower than a price of 100,100 yen offered by company B. Thus, company A is selected as a product provider.

When the depression count for PP juice is assumed to be 15,000, the price offered by company B is 90 yen, which is lower than a price of 110 yen offered by company A. Thus, company B is selected as a product provider.

Referring back to FIG. 2, the presenting unit 104 transmits, to the viewer's video presenting apparatus 200 via the communication unit 120, presentation information for causing the video presenting apparatus 200 to present the product provider information of the product provider, selected by the selecting unit 103, and the product information of the product, identified by the identifying unit 102, in an associated manner. Then, by using the presentation information, the video presenting apparatus 200 presents, in an associated manner, the product information of the product in which the viewer is interested and the product provider information of the product provider that offers the product.

Examples of the product information include the product name, the product field, the product number, and so on illustrated in FIG. 7. Examples of the product provider information include the product provider name, the price, and so on illustrated in FIG. 7. The presentation information may also be a uniform resource locator (URL) of a product providing site through which the product provider prompts viewers to purchase products over the Internet. The presenting unit 104 may retrieve the URL of the product providing site from a location information table (see FIG. 8) stored in the location-information storage unit 109.

FIG. 8 illustrates one example of the data structure of the location information table. The location information table is a two-dimensional relational database in which the location information of the product providers registered in the product provider information table is registered in advance. In the example in FIG. 8, the location information table has fields for "product provider", "URL", "product providing place", and "address of actual store". The "product providers" illustrated in FIG. 8 are the same as the product providers illustrated in FIG. 7. The "URL" is location information indicating, on the Internet, a storage location of a product providing site operated by the corresponding product provider. The product providing site is provided, for example, on the product provider server 400.

The "product providing place" is location information indicating the location of an actual store that each product provider operates in real space. For example, company A operates store AA and store AB as actual stores, so that, in the example in FIG. 8, the location information of store AA and the location information of store AB are registered. The location information of the actual store includes, for example, latitude and longitude. Since store AA is located at a latitude of XAA and a longitude of YAA, (XAA, YAA) is registered as the location information of store AA in the example in FIG. 8. The address of the actual store registered in the "product providing place" field is registered in the "address of actual store" field. In addition, for example, telephone numbers of actual stores may also be registered in the location information table in FIG. 8.

Also, a communication address of the video presenting apparatus 200 may be inserted into the input notification transmitted from the video presenting apparatus 200, and the presenting unit 104 may transmit presentation information to the communication address.

Referring back to FIG. 2, the registering unit 105 receives the price of each product, offered by the product provider, from the product provider server 400 (see FIG. 1), as needed, and registers the received price in the product provider information table stored in the product-provider-information storage unit 106. For example, when a request for setting a price for each product is obtained from a new product provider, the registering unit 105 newly creates a record in the product provider information table for the product provider and registers corresponding information in the fields, such as the "price" field in the record. Also, when a product provider already registered in the product provider information table changes the price of a registered product, and a request for setting the price in which the change is reflected is transmitted from the product provider server 400, the registering unit 105 updates, in the product provider information table, the pre-change product price indicated in the "price" field in the corresponding record with the post-change product price. Processing as described above is performed, as needed, to create the product provider information table illustrated in FIG. 7.

The product-provider-information storage unit 106 stores therein the product provider information table illustrated in FIG. 7.

By using a result of the product identification performed by the identifying unit 102, the counting unit 107 counts the number of viewers who have expressed interest in each product. More specifically, when the identifying unit 102 identifies a product, the counting unit 107 increments the number of inputs of interest instructions for the product by "1" and registers the incremented value in a count-number management table (not illustrated). In this case, the count-number management table is a table in which, for example, the product information of one or more products and the number of inputs of interest instructions for each product are associated with each other, and is stored, for example, in a storage device (not illustrated).

For example, when it is assumed that the identifying unit 102 identifies QQ washing machine as a product and a count value of 100,000 for QQ washing machine is registered in the count-number management table, the counting unit 107 updates the count value to 100,001 for the QQ washing machine.

The number-of-viewers presenting unit 108 presents a bidding display screen including the number of viewers for each product, the number being counted by the counting unit 107, to the product provider server 400. FIG. 9 illustrates one example of the bidding display screen. The bidding display screen is an image in a tabular form and displays a product provider that sells each product at the lowest price. More specifically, the bidding display screen has fields for "product provider", "product field", "product name", "product number", "depression count", and "lowest price". The fields for the "product provider", "product field", "product name", and "product number" are the same as those having the same names illustrated in FIG. 7. The "depression count" indicates the number of times viewers have input interest instructions for the corresponding product. For example, since company A presented 100,000 yen, which is the lowest price, for QQ washing machine, company A is registered in the "product provider" field. Also, since company B presented 50 yen, which is the lowest price, for PP juice, company B is registered in the "product provider" field.

More specifically, the number-of-viewers presenting unit 108 identifies a count value for each product on the basis of the count-number management table (not illustrated) managed by the counting unit 107 and extracts, from the product provider information table stored in the product-provider-information storage unit 106, a product provider that offers the lowest price for the identified count value. The number-of-viewers presenting unit 108 then associates the product information of each product and the product provider information of the product provider that offers the lowest price for each product to thereby generate a bidding display screen and transmits the generated bidding display screen to the product provider server 400 via the communication unit 120.

Upon receiving the bidding display screen, the product provider server 400 displays the bidding display screen on a display unit (not illustrated) of the product provider server 400. The display unit (not illustrated) of the product provider server 400 includes a display panel, such as a liquid-crystal display panel or an organic electroluminescent (EL) panel. Thus, the product provider recognizes the lowest price of each product by viewing the bidding display screen and decides its setting price for the product. The lowest price of each product is displayed on the bidding display screen, as described above, which provides a decision material with which a product provider sets the price of each product.

In this case, the operating company of the information processing apparatus 100 may also present the bidding display screen to a product provider, on the condition that the fee is paid. For example, it is assumed that product providers, that is, companies A and B, have paid the fee for the bidding display screen, and company C has not paid the fee for the bidding display screen. In this case, the number-of-viewers presenting unit 108 may be adapted to present the bidding display screen to only companies A and B and not to present the bidding display screen to company C.

The selecting unit 103 may also select a product provider by using an amount paid for the fee for the bidding display screen. That is, in the above description, the selecting unit 103 selects, from the product provider information table, a product provider that has offered the lowest price for a product. Instead, the selecting unit 103 may also select, as a product provider, a product provider that has paid a largest amount for the bidding display screen. In this case, the product-provider-information storage unit 106 may store therein a bidding-display-screen purchase table in which one or more product providers and amounts paid for the bidding display screen by the product providers are associated with each other, and the selecting unit 103 may select a product provider whose amount paid money registered in the bidding-display-screen purchase table is the largest as a product provider for a product identified by the identifying unit 102.

The viewer-information storage unit 110 stores a viewer information table therein. The viewer information table is a table in which information about viewers to which services are provided in the information providing system is registered. FIG. 10 illustrates one example of the data structure of the viewer information table. The viewer information table has fields for "viewer name", "communication address of video presenting apparatus", "communication address of portable terminal", and "communication address of navigation apparatus". The "viewer name" is identification information of a viewer to which a service is to be provided and may be the name of a viewer in the example in FIG. 10. The "communication address of video presenting apparatus" is a communication address of the video presenting apparatus 200 owned by the viewer. The "communication address of portable terminal" is a communication address of the portable terminal 500 carried by the viewer with him or her. The "communication address of navigation apparatus" is a communication address of the navigation apparatus 600 owned by the viewer.

The communication unit 120 receives an input notification transmitted from the video presenting apparatus 200 and passes the input notification to the identifying unit 102. The communication unit 120 also receives, from the presenting unit 104, a request for transmitting product provider information and so on to one video presenting apparatus 200 and transmits the product provider information or the like to the video presenting apparatus 200. The communication unit 120 also receives a setting request for setting a price for each product, the request being transmitted from the product provider server 400, and passes the setting request to the registering unit 105. Additionally, the communication unit 120 receives data transmitted to the information processing apparatus 100, passes the received data to each block, receives a data transmission request from each block, and transmits requested data to a corresponding transmission destination.

In FIG. 2, the identifying unit 102, the selecting unit 103, the presenting unit 104, the registering unit 105, the counting unit 107, and the number-of-viewers presenting unit 108 are implemented by, for example, an information processing program for causing a computer to function as the information processing apparatus 100 and are realized by the CPU executing the information processing program. The information processing program is stored, for example, in a ROM or RAM included in the computer, and the information processing apparatus 100 is configured so that the information processing program is read and the CPU executes the read information processing program. This, however, is merely one example, and the identifying unit 102, the selecting unit 103, the presenting unit 104, the registering unit 105, the counting unit 107, and the number-of-viewers presenting unit 108 may be implemented by dedicated hardware circuits, such as application-specific integrated circuit (ASICs) or field programmable gate arrays (FPGAs). The product-provider-information storage unit 106 and the location-information storage unit 109 are implemented by, for example, a nonvolatile storage device. The communication unit 120 may also be implemented by a communication circuit for connecting the information processing apparatus 100 via the communications network NT.

Figure 3:
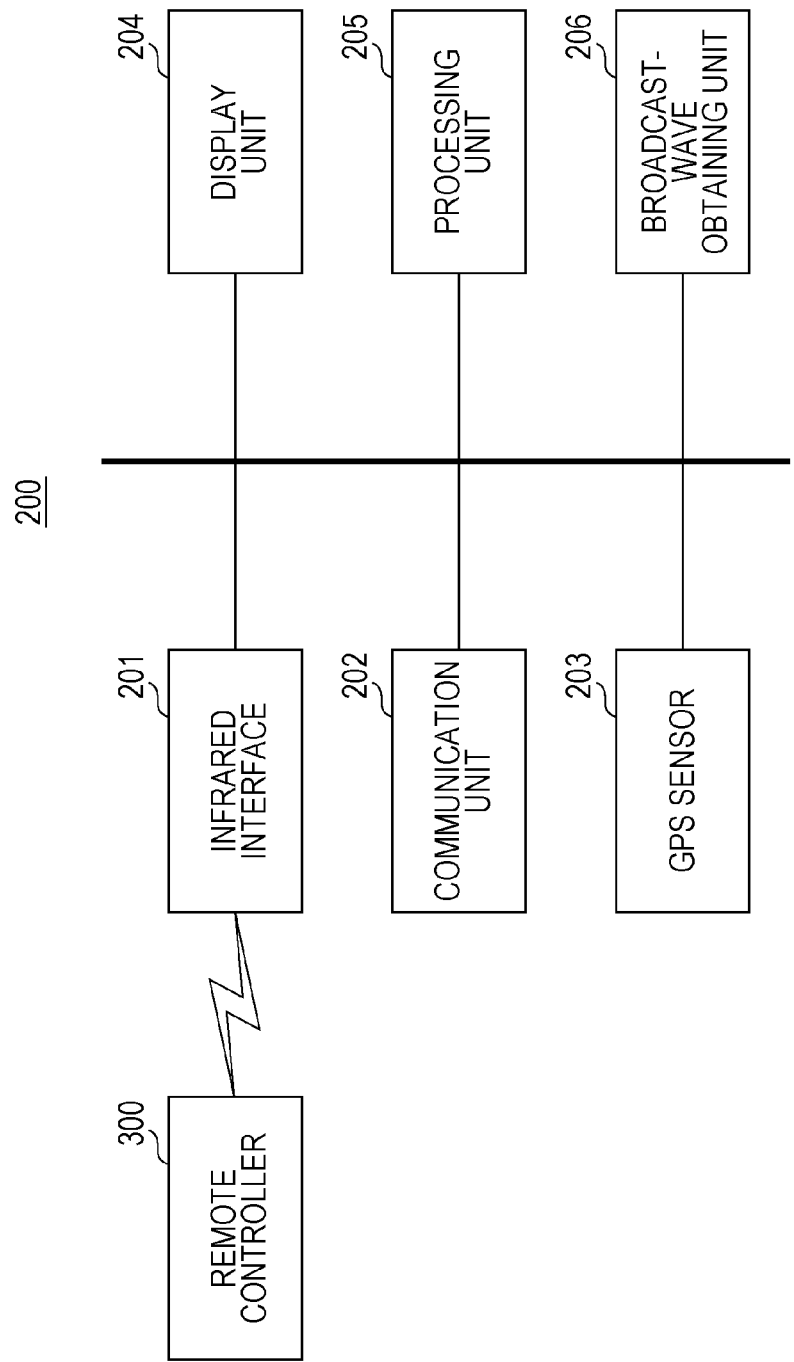
FIG. 3 is a block diagram illustrating one example of the functional configuration of a video presenting apparatus.

FIG. 3 is a block diagram illustrating one example of the functional configuration of the video presenting apparatus 200. The video presenting apparatus 200 includes an infrared interface 201, a communication unit 202, a global positioning system (GPS) sensor 203, a display unit 204, a processing unit 205, and a broadcast-wave obtaining unit 206. The blocks included in the video presenting apparatus 200 are inter-connected through an internal bus.

The infrared interface 201 is implemented by, for example, a communication circuit for performing infrared communication and receives, for example, various commands transmitted from the remote controller 300. The commands include a command for setting the channel of the video presenting apparatus 200, a command for adjusting the audio volume, and a command for adjusting the image quality. In the present embodiment, the commands further include a command indicating that the interest instruction button is depressed.

The communication unit 202 is implemented by a communication circuit for connecting the video presenting apparatus 200 to information processing apparatus 100, the product provider server 400, the portable terminal 500 and the navigation apparatus 600 via the communications network NT. For example, when the infrared interface 201 receives the command indicating that the interest instruction button is depressed, the communication unit 202 transmits, to the information processing apparatus 100, an input notification including the communication address of the video presenting apparatus 200, the input time, and the channel information.

The GPS sensor 203 communicates with GPS satellites to obtain the location information of the video presenting apparatus 200. The display unit 204 includes a display panel, such as a liquid-crystal display panel or an organic electroluminescent (EL) panel. For example, the display unit 204 displays video of a broadcast wave and product provider information transmitted from the information processing apparatus 100, and so on.

The processing unit 205 is implemented by, for example, a dedicated hardware circuit, such as an ASIC or an FPGA, and is responsible for overall control of the video presenting apparatus 200. For example, when the communication unit 202 receives a product provider URL transmitted by the information processing apparatus 100, the processing unit 205 accesses the URL to cause the display unit 204 to display the product providing site. Also, for example, when the infrared interface 201 receives a command indicating that an interest instruction is input, the processing unit 205 generates an input notification and transmits the generated input notification to the information processing apparatus 100 via the communication unit 202. For example, the processing unit 205 also causes the display unit 204 to display video of a broadcast wave demodulated by the broadcast-wave obtaining unit 206.

The broadcast-wave obtaining unit 206 is implemented by, for example, a tuner. The broadcast-wave obtaining unit 206 detects a broadcast wave of a channel that the viewer set using the remote controller 300 or the like. The broadcast-wave obtaining unit 206 further demodulates the broadcast wave, and passes the resulting broadcast wave to the processing unit 205.

Figure 11:
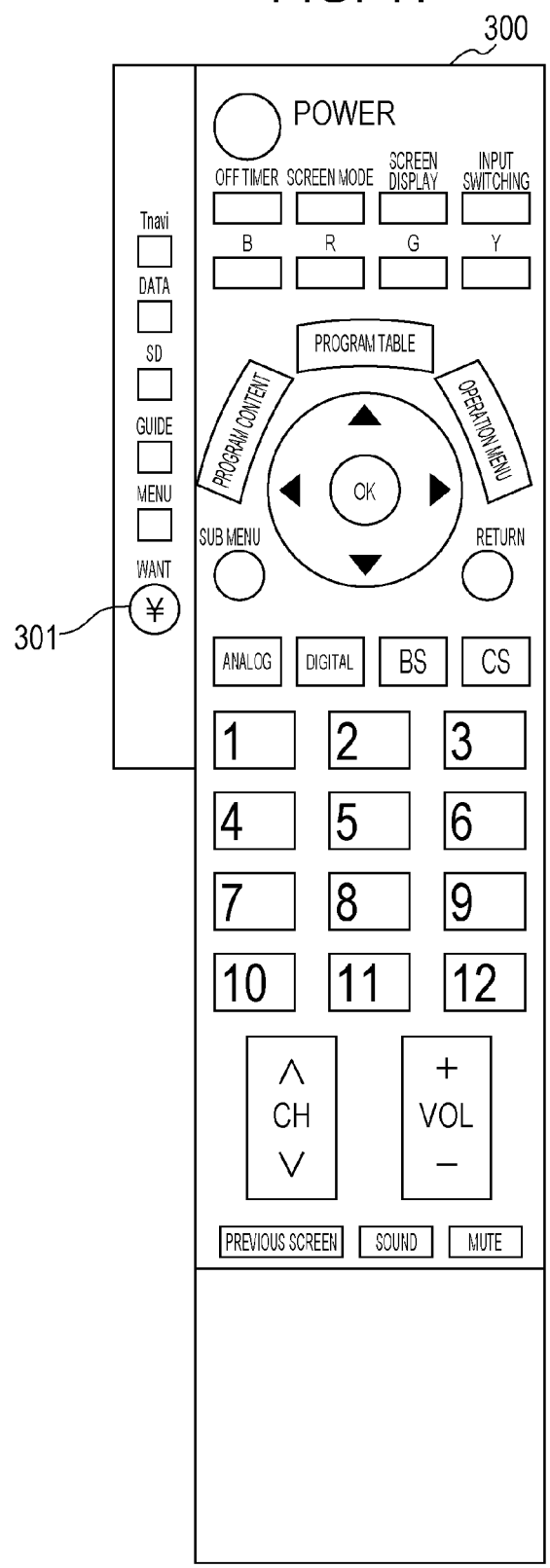
FIG. 11 is a view of one example of the external appearance of a remote controller.

The remote controller 300 receives an operation from the viewer. FIG. 11 is a view of one example of the external appearance of the remote controller 300. As illustrated in FIG. 11, the remote controller 300 includes a "power" button for turning on or off the video presenting apparatus 200, a "channel" button for cyclically switching the channel, a numeric keypad indicating "1" to "12" for directly inputting a channel number, and a "volume" button for adjusting the volume of sound output by the video presenting apparatus 200. In particular, in the example in FIG. 11, an interest instruction button 301 showing a yen mark is provided. The viewer watches the video displayed on the video presenting apparatus 200, and depresses the interest instruction button 301 when he or she is interested in a product included in the video.

Figure 4:
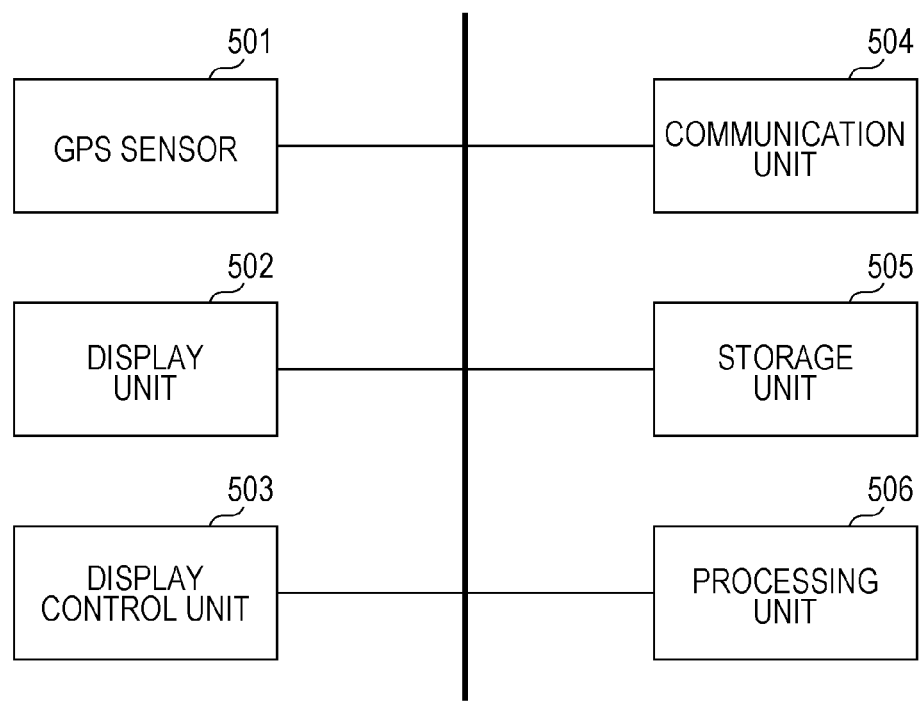
FIG. 4 is a block diagram illustrating one example of the functional configuration of a portable terminal.

FIG. 4 is a block diagram illustrating one example of the functional configuration of the portable terminal 500. The portable terminal 500 includes a GPS sensor 501, a display unit 502, a display control unit 503, a communication unit 504, a storage unit 505, and a processing unit 506.

The GPS sensor 501 communicates with GPS satellites to obtain the location information of the portable terminal 500. The display unit 502 includes a liquid-crystal display or an organic EL display. For example, when the portable terminal 500 is a smartphone or a tablet terminal, the display unit 502 has a touch panel. For example, when a contact object, such as the user's finger, touches the touch panel of the display unit 502, the display control unit 503 detects the contact position, and determines that, when a graphical user interface (GUI) component (e.g., an icon) is displayed at the contact position, the user operated the GUI component.

The communication unit 504 is implemented by, for example, a communication circuit for connecting the portable terminal 500 to the information processing apparatus 100, the video presenting apparatus 200, the product provider server 400 and the navigation apparatus 600 via the communications network NT (for example, the Internet) or a mobile phone communication network.

The storage unit 505 is implemented by, for example, a nonvolatile storage device and stores therein an operating system and application software of the portable terminal 500. The processing unit 506 is implemented by, for example, a dedicated hardware circuit, such as an ASIC or an FPGA, and is responsible for overall control of the portable terminal 500.

Figure 5:
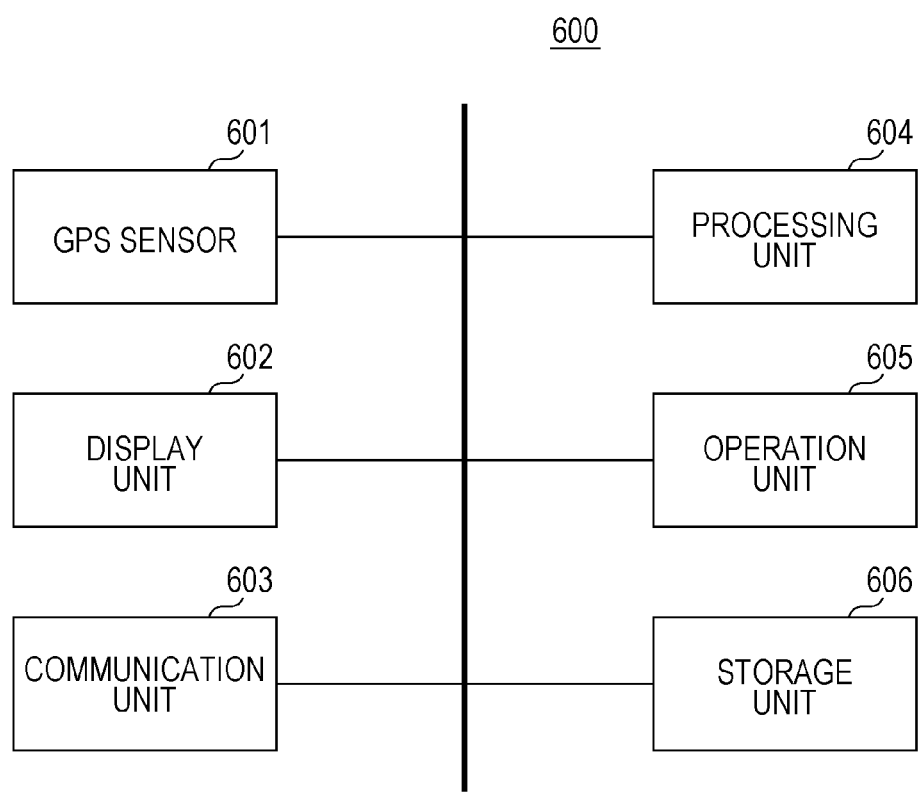
FIG. 5 is a block diagram illustrating one example of the functional configuration of a navigation apparatus.

FIG. 5 is a block diagram illustrating one example of the functional configuration of the navigation apparatus 600. The navigation apparatus 600 includes a GPS sensor 601, a display unit 602, a communication unit 603, a processing unit 604, an operation unit 605, and a storage unit 606.

The GPS sensor 601 communicates with GPS satellites to obtain the location information of the navigation apparatus 600. The display unit 602 includes a liquid-crystal display panel, an organic EL panel, or the like and displays a map image and so on.

The communication unit 603 is implemented by a communication circuit for connecting the navigation apparatus 600 to the information processing apparatus 100, the video presenting apparatus 200, the product provider server 400 and the portable terminal 500 via the communications network NT. The processing unit 604 is implemented by a dedicated hardware circuit, such as an ASIC or an FPGA, and is responsible for overall control of the navigation apparatus 600. For example, when a destination is input using the operation unit 605, the processing unit 604 uses map data, stored in the storage unit 606, to search for a route from the current location detected by the GPS sensor 601 to the destination and causes the display unit 602 to display a found route on a map image in an overlapping manner.

The operation unit 605 includes, for example, an operation button for receiving an operation from the user. The storage unit 606 is implemented by, for example, a nonvolatile storage device and stores map data and so on therein.

Figure 6:
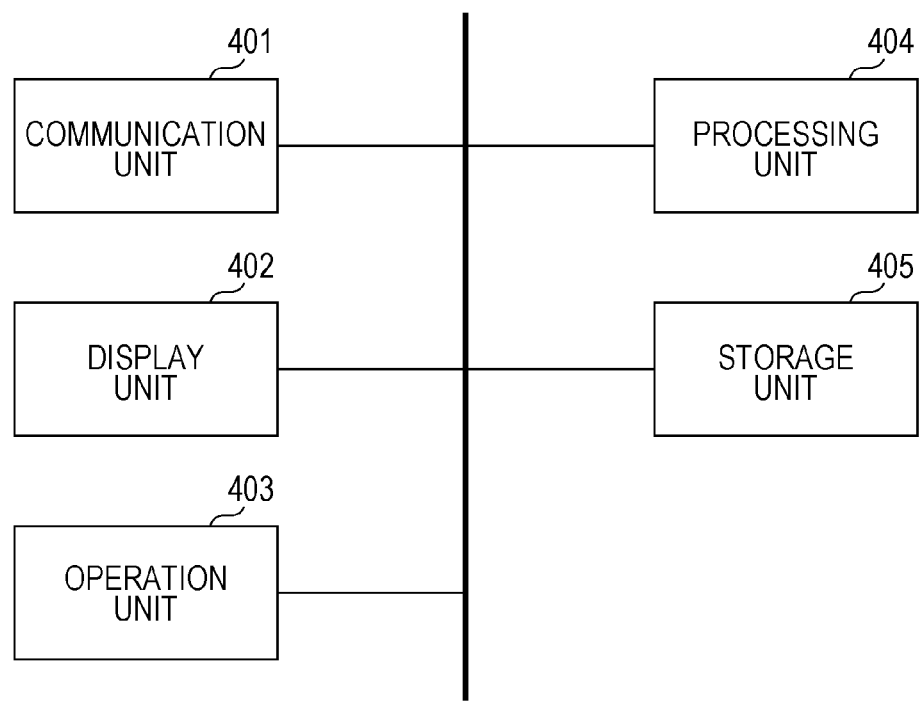
FIG. 6 is a block diagram illustrating one example of the functional configuration of a product provider server.

FIG. 6 is a block diagram illustrating one example of the functional configuration of the product provider server 400. The product provider server 400 includes a communication unit 401, a display unit 402, an operation unit 403, a processing unit 404, and a storage unit 405.

The communication unit 401 is implemented by a communication circuit for connecting the product provider server 400 to information processing apparatus 100, the video presenting apparatus 200, the portable terminal 500 and the navigation apparatus 600 via the communications network NT. For example, the communication unit 401 receives, from the processing unit 404, a setting request for a product provider to set a price for each product and transmits the setting request to the information processing apparatus 100. For example, the communication unit 401 also receives the bidding display screen transmitted from the information processing apparatus 100.

The display unit 402 includes a liquid-crystal panel or an organic EL panel, and displays various images under the control of the processing unit 404. For example, the display unit 402 displays the bidding display screen transmitted from the information processing apparatus 100.

The operation unit 403 includes input devices, such as a keyboard and a mouse. For example, the operation unit 403 receives a price for each product, the price being input by an operator of the product provider server 400.

The processing unit 404 is implemented by, for example, a CPU and is responsible for overall control of the product provider server 400. For example, when the communication unit 401 receives bidding-display-screen data transmitted from the information processing apparatus 100, the processing unit 404 causes the bidding display screen to be displayed on the display unit 402.

The storage unit 405 is implemented by, for example, a nonvolatile storage device and stores, for example, a program for causing a computer to function as the product provider server 400. When the processing unit 404 reads the program stored in the storage unit 405 and the executes the program, the computer functions as the product provider server 400.

Figure 12:
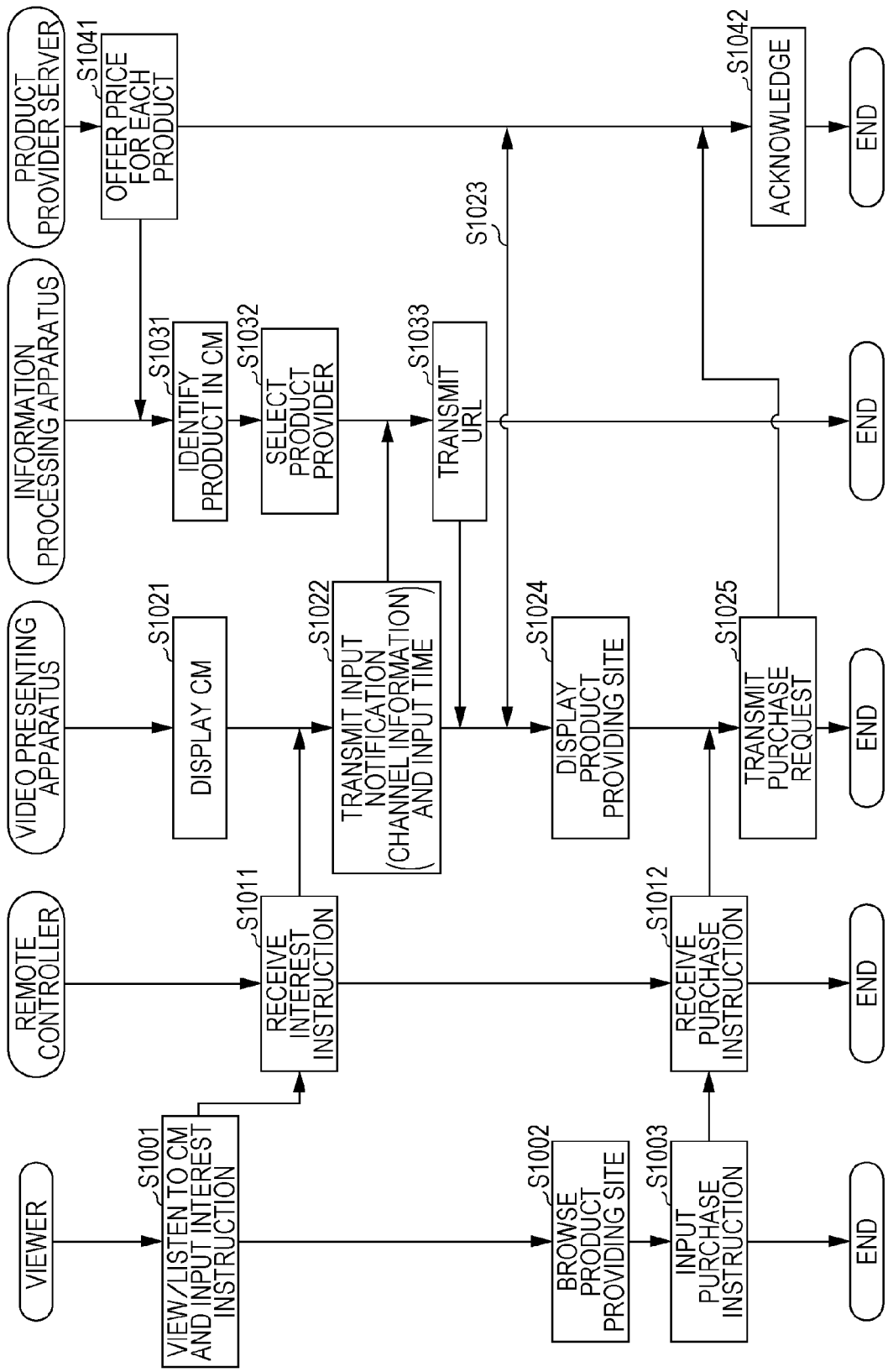
FIG. 12 is a sequence diagram illustrating one example of a flow of processing in the information providing system in the first embodiment.

FIG. 12 is a sequence diagram illustrating one example of a flow of processing in the information providing system in the first embodiment. In the following sequence diagram, it is assumed that a commercial (hereinafter abbreviated as "CM") is used as content and the information processing apparatus 100 identifies a product in a CM. It is also assumed that, for example, the information processing apparatus 100 receives broadcast waves of all channels that can be received by the video presenting apparatus 200 and identifies a CM on the basis of the received broadcast waves.

First, the product provider server 400 transmits, to the information processing apparatus 100, a request for setting and offering a price for each product (S1041). When the information processing apparatus 100 receives the setting request, the registering unit 105 registers, in the product provider information table, the price and so on indicated by the received setting request. In the example in FIG. 12, the process in S1041 is provided before S1031, but is executed as needed, each time a price setting request is transmitted from the product provider server 400.

Next, by using broadcast waves that are received, the identifying unit 102 in the information processing apparatus 100 identifies a product in a CM (S1031). In this case, for example, by using a broadcast schedule acquired in advance, the identifying unit 102 may determine whether or not a CM is broadcast. Upon determining that a CM is broadcast, the identifying unit 102 may identify a product in the CM by using any of the schemes in identifying methods 1 to 4 described above.

Next, by using the product provider information table (FIG. 7), the selecting unit 103 in the information processing apparatus 100 selects a product provider that offers the product, identified in S1031, for example, at the lowest price.

The video presenting apparatus 200 receives a broadcast wave and displays the video of a CM (S1021). The CM referred to in S1021 and the CM referred to in S1031 represent the same CM.

The viewer who is interested in the CM displayed on the video presenting apparatus 200 in S1021 inputs an interest instruction (S1001). In this case, the viewer may input the interest instruction, for example, by depressing the interest instruction button 301 illustrated in FIG. 11.

When the interest instruction button 301 is depressed, the remote controller 300 receives the input interest instruction (S1011) and transmits, to the video presenting apparatus 200, a command indicating that the interest instruction is input.

Upon receiving the command indicating that the interest instruction is input, the video presenting apparatus 200 generates an input notification including channel information indicating the channel of a broadcast wave that the video presenting apparatus 200 was receiving when the interest instruction was input and the input time of the interest instruction and transmits the input notification to the information processing apparatus 100 (S1022).

Next, the presenting unit 104 in the information processing apparatus 100 identifies, in the location information table (FIG. 8), the URL of the product provider selected in S1032 and transmits the identified URL to the video presenting apparatus 200 (S1033).

Upon receiving the URL, the video presenting apparatus 200 specifies the URL to access the product provider server 400 and receives HyperText Markup Language (HTML) data of a product providing site (S1023). Although HTML data written in HTML is used in this case, the present embodiment is not limited thereto. For example, data written in another language, such as Extensible Markup Language (XML) or JavaScript (registered trademark) Object Notation (JSON) may also be used. This also applies to S1126 in FIG. 13, S1606, S1612, and S1619 in FIG. 14, and S1215 in FIG. 16, which are described below.

Next, the video presenting apparatus 200 uses the received HTML data to display an image of the product providing site (S1024).

Next, the viewer browses the product providing site displayed ion the video presenting apparatus 200 (S1002). Next, when the viewer decides to purchase a product, he or she inputs a product purchase instruction to the remote controller 300 (S1003). Next, the remote controller 300 receives the purchase instruction input by the viewer (S1012) and transmits, to the video presenting apparatus 200, a command indicating that the purchase instruction is input (S1012). Upon receiving the command, the video presenting apparatus 200 transmits a purchase request for purchasing the corresponding product to the product provider server 400 (S1025). Upon receiving the purchase request, the product provider server 400 acknowledges the product purchase made by the viewer (S1042). As a result, the product is delivered from the product provider by mail or the like at a later date, and the viewer receives the product.

In FIG. 12, S1001, S1011, and S1022 correspond to one example of a receiving step, S1031 corresponds to one example of an identifying step, S1032 corresponds to one example of a selecting step, and S1033, S1023, and S1024 correspond to one example of a presenting step.

The above description has been given of a case in which the viewer operates the video presenting apparatus 200 by using the remote controller 300. This, however, is merely one example, and the viewer may operate the video presenting apparatus 200 by using the portable terminal 500.

Figure 13:
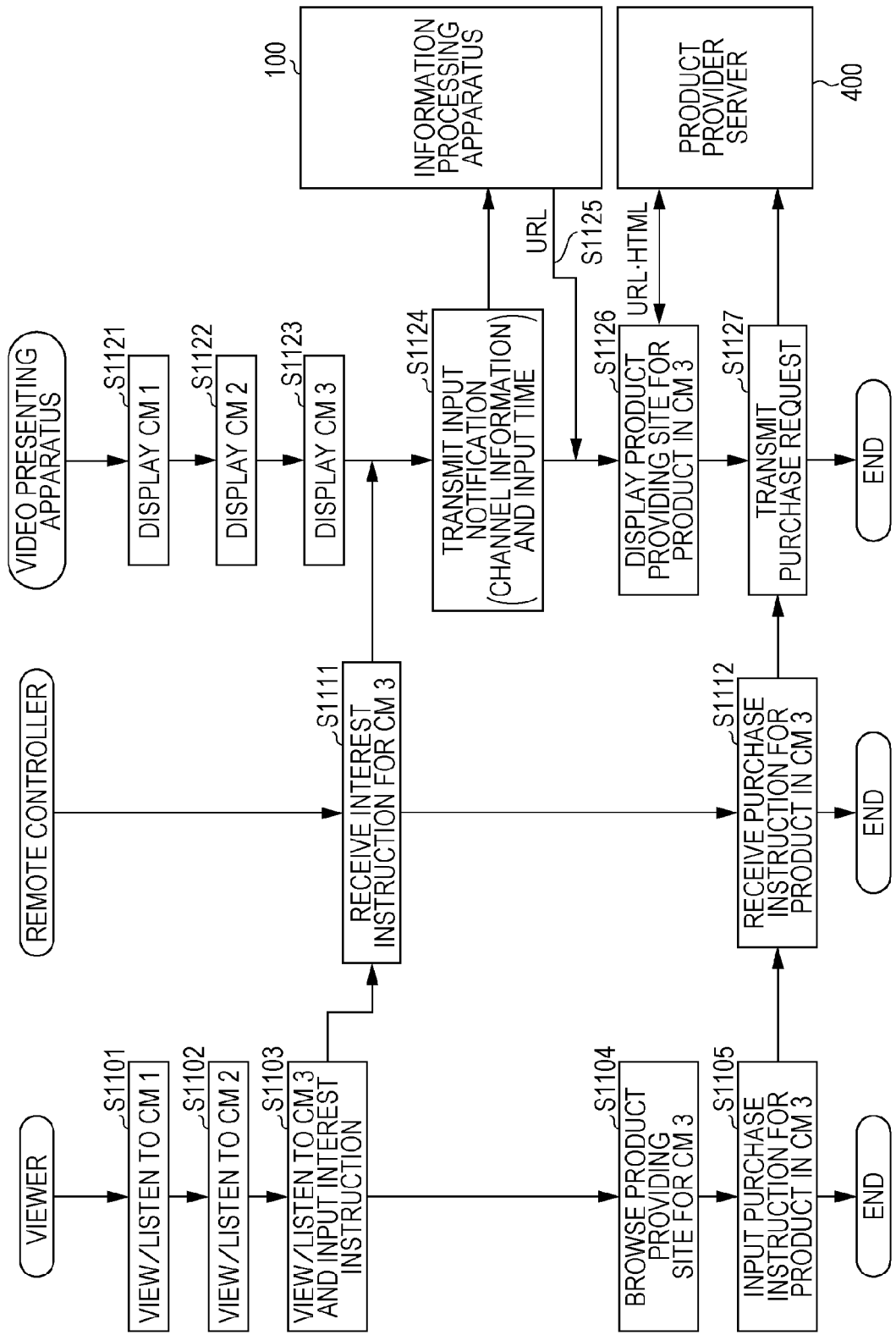
FIG. 13 is a sequence diagram illustrating one example of the operations of a viewer, the remote controller, and the video presenting apparatus in the information providing system in the first embodiment.

FIG. 13 is a sequence diagram illustrating a case in which attention is given to the operations of the viewer, the remote controller 300, and the video presenting apparatus 200 in the information providing system in the first embodiment. The video presenting apparatus 200 receives broadcast waves and sequentially displays CM 1, CM 2, and CM 3 (S1121, S1122, and S1123). The viewer sequentially views/listens to CM 1, CM 2, and CM 3 displayed by the video presenting apparatus 200 (S1101, S1102, and S1103). The viewer then has an interest in a product in CM 3 and inputs an interest instruction (S1103). In response, the remote controller 300 receives the input interest instruction (S1111) and transmits, to the video presenting apparatus 200, a command indicating that the interest instruction is input. Upon receiving the command, the video presenting apparatus 200 generates an input notification including channel information and the input time and transmits the input notification to the information processing apparatus 100 (S1124).

Upon receiving the input notification, the information processing apparatus 100 transmits, to the video presenting apparatus 200, the URL of a product providing site of a product provider that offers the product in CM 3 at the lowest price (S1125). Upon receiving the URL, the video presenting apparatus 200 specifies the URL to access the product providing site, receives the HTML data of the product providing site that offers the product in CM 3, and displays the product providing site (S1126).

When the viewer browses the product providing site that offers the product in CM 3 and decides to purchase the product (S1104), he or she inputs a purchase instruction for the product (S1105). The remote controller 300 receives the input purchase instruction (S1112) and transmits, to the video presenting apparatus 200, a command indicating that the purchase instruction is input. Upon receiving the command, the video presenting apparatus 200 transmits a purchase request to the product provider server 400 (S1127).

Figure 14:
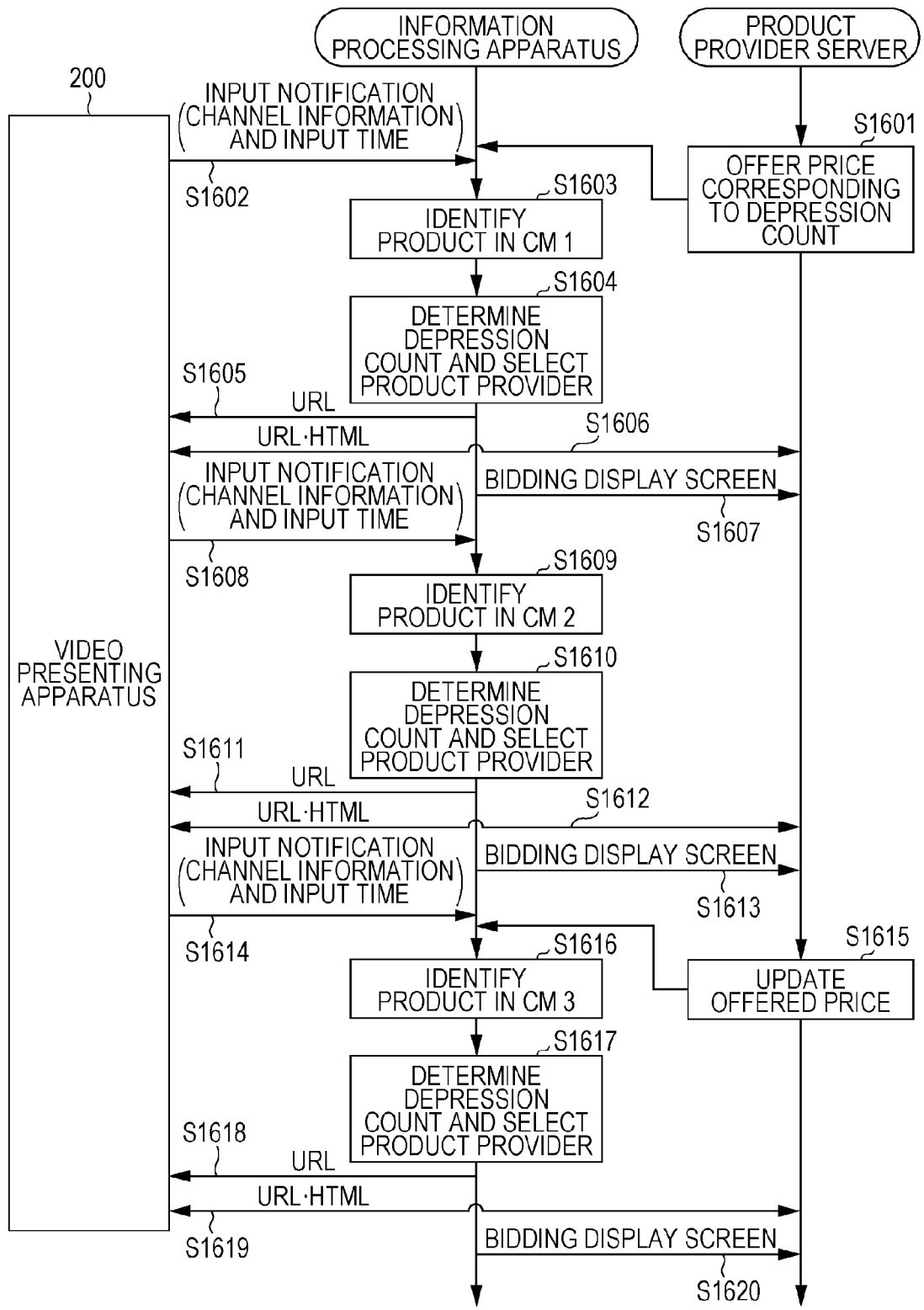
FIG. 14 is a sequence diagram illustrating one example of the operations of the information processing apparatus and the product provider server in the information providing system in the first embodiment.

FIG. 14 is a sequence diagram when attention is given to the information processing apparatus 100 and the product provider server 400 in the information providing system in the first embodiment, and corresponds to FIG. 13.

First, as in S1041 in FIG. 12, the product provider server 400 transmits, to the information processing apparatus 100, a setting request for setting and offering a price for each product (S1601). In this case, for each product, the product provider server 400 offers a price that differs depending on the depression count. That is, for each product, the product provider server 400 offers a price that differs depending on the number of times interest instructions were input by viewers.

Next, a viewer who has viewed/listened to CM 1 inputs an interest instruction, and an input notification including the channel information and the input time of the interest instruction is transmitted from the video presenting apparatus 200 (S1602). Thus, the communication unit 120 in the information processing apparatus 100 receives the input notification. The identifying unit 102 in the information processing apparatus 100 then uses the received input notification to identify a product in which the viewer is interested. In this case, the identifying unit 102 identifies a product in CM 1. In this case, the identifying unit 102 may identify the product in which the viewer is interested, by using any of the schemes of identifying methods 1 to 4 described above.

Next, the counting unit 107 in the information processing apparatus 100 increments the number of inputs of interest instructions for the product in CM 1, the product being identified in S1603, by one (S1604). Also, with respect to the number of inputs of interest instructions for the product in CM 1, the number being counted by the counting unit 107, the selecting unit 103 uses the product provider information table (FIG. 7) to select a product provider that offers the product in CM 1 at the lowest price (S1604).

Next, the presenting unit 104 in the information processing apparatus 100 uses the location information table (FIG. 8) to identify the URL of the product provider selected in S1604 and transmits the URL to the video presenting apparatus 200 (S1605).

Next, the video presenting apparatus 200 specifies the received URL to access the product provider server 400 and receives the HTML data of the product providing site (S1606).

The number-of-viewers presenting unit 108 in the information processing apparatus 100 generates a bidding display screen in which the depression count for the product in CM 1 is updated and transmits the bidding display screen to the product provider server 400 (S1607). In this case, the number-of-viewers presenting unit 108 may transmit the bidding display screen to the product provider servers 400 of all product providers that pay the fees for the bidding display screen or may transmit the bidding display screen to only the product provider server 400 of the product provider selected in S1604. Also, when an arrangement in which the bidding display screen is simultaneously transmitted to all of the product provider servers 400 at a predetermined time is used, the number-of-viewers presenting unit 108 may transmit a bidding display screen in which an updated depression count is reflected to the product provider server 400 at the predetermined time.

Next, processing that is similar to that on CM 1 is repeated on CM 2 (S1608 to S1613). Next, the viewer who has viewed/listened to CM 3 inputs an interest instruction, and an input notification of the interest instruction is transmitted from the video presenting apparatus 200 (S1614). Thus, the communication unit 120 in the information processing apparatus 100 receives the input notification.

Next, a setting request for changing the price for each product is transmitted from the product provider server 400 (S1615), so that the communication unit 120 in the information processing apparatus 100 receives the setting request.

At this point, in accordance with the setting request, the registering unit 105 in the information processing apparatus 100 immediately updates the product provider information table (FIG. 7).

Next, as in the case of CM 1, the identifying unit 102 in the information processing apparatus 100 identifies a product in CM 3 (S1616). Next, by using the product provider information table updated by the registering unit 105, the selecting unit 103 in the information processing apparatus 100 selects a product provider that offers the product in CM 3 at the lowest price (S1617).

As a result, since a change in the price for each product of the product provider is immediately reflected in the product provider information table, a product provider that offers a product at the lowest price can be introduced to the viewers, even when the price of each product of the product provider varies dynamically.

Since S1618 to S1620 are analogous to S1605 to S1607, descriptions thereof are not given hereinafter.

The product-provider selecting method described above is a method for selecting a product provider, for example, after a CM for a product is broadcast. In addition, for example, the lowest price that has varied dynamically because of the depression count or an update of the offered price or information of a selection result of a product provider based on the lowest price may be transmitted to the video presenting apparatus 200 so as to be presented to the viewer at the video presenting apparatus 200 in real time.

Figure 15:
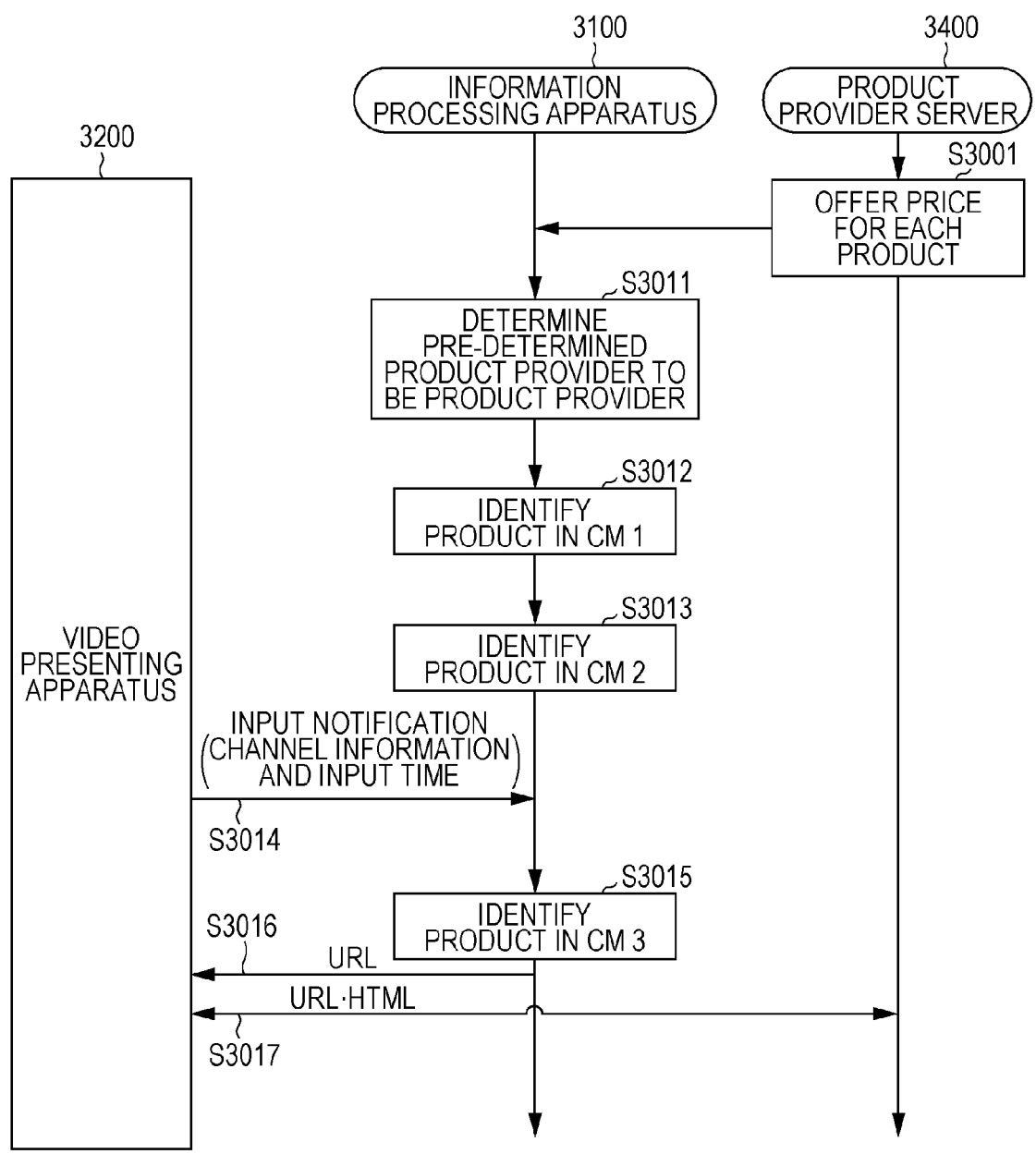
FIG. 15 is a sequence diagram of a comparative example.

Next, a description will be given of a comparative example of the information providing system. FIG. 15 is a sequence diagram of the comparative example and corresponds to FIG. 14.

First, a product provider server 3400 transmits, to an information processing apparatus 3100, a setting request for setting and offering a price for each product (S3001). Next, with respect to each product, the information processing apparatus 3100 determines a pre-determined product provider as the product provider of the product (S3011). For example, when company A is pre-determined as the product provider of QQ washing machine, company A is determined to be the product provider of QQ washing machine, regardless of the price offered by company A. Thus, in S3001, for example, even when company B has offered a lower price than that of company A with respect to QQ washing machine, company A is determined to be the product provider.

Next, CM 1 and CM 2 are sequentially broadcast, so that the information processing apparatus 3100 sequentially identifies a product in CM 1 and a product in CM 2 (S3012 and S3013).

Next, the viewer who has viewed/listened to CM 3 inputs an interest instruction, an input notification of the interest instruction is transmitted from a video presenting apparatus 3200 (S3014), and the information processing apparatus 3100 receives the input notification. Next, the information processing apparatus 3100 identifies the product in CM 3 (S3015). Next, the information processing apparatus 3100 transmits, to the video presenting apparatus 3200, the URL of the product providing site of the product provider pre-determined in S3011 with respect to the product in CM 3 (S3016). Next, the video presenting apparatus 3200 specifies the received URL to access the product providing site to receive the HTML data of the product providing site (S3017) and displays the image of the product providing site.

As described above, in the comparative example, one product provider pre-determined with respect to a certain product is determined to be the product provider of the product. Thus, there is a problem in that viewers can not necessarily purchase the product at the lowest price.

On the other hand, in the sequence diagram in FIG. 14, with respect to a certain product, the product provider that offers the lowest price is determined to be the product provider of the product, and the product providing site of the product provider is presented to the video presenting apparatus 200. Thus, the viewer can purchase a product in which he or she expressed interest at the lowest price.

As described above, in the first embodiment, the product provider information table in which the prices for products of one or more product providers are pre-registered is used to select, for example, a product provider that offers the lowest price. Thus, even for an interest instruction input by the viewer at any timing, a product provider that offers the lowest price can be quickly selected and can be presented to the viewer. As a result, it is possible to reduce latency from when the viewer inputs an interest instruction until, for example, a product provider that offers the lowest price is presented to the viewer.

For example, when a viewer has an interest in a product in a CM while viewing/listening to the CM and inputs an interest instruction, the product providing site of a product provider that offers the lowest price is quickly displayed. Thus, the viewer can immediately purchase a product he or she wants.

Also, since the time when the viewer who has viewed/listened to a CM wants a product is the time when the viewer's willingness to purchase it is high, the chance of purchasing the product can be given to the viewer when the willingness to purchase is high. As a result, the product provider can give the chance of purchasing the product to the viewer, without losing the timing at which the willingness to purchase is high, thus making it possible to sell a larger number of product.

Also, only performing a casual operation, that is, inputting an interest instruction, allows a product providing site that offers a product in which the viewer is interested to be presented to him or her, thus making it possible to increase the number of accesses to the product providing site. As a result, the product provider can sell a larger number of products.

Figure 16:
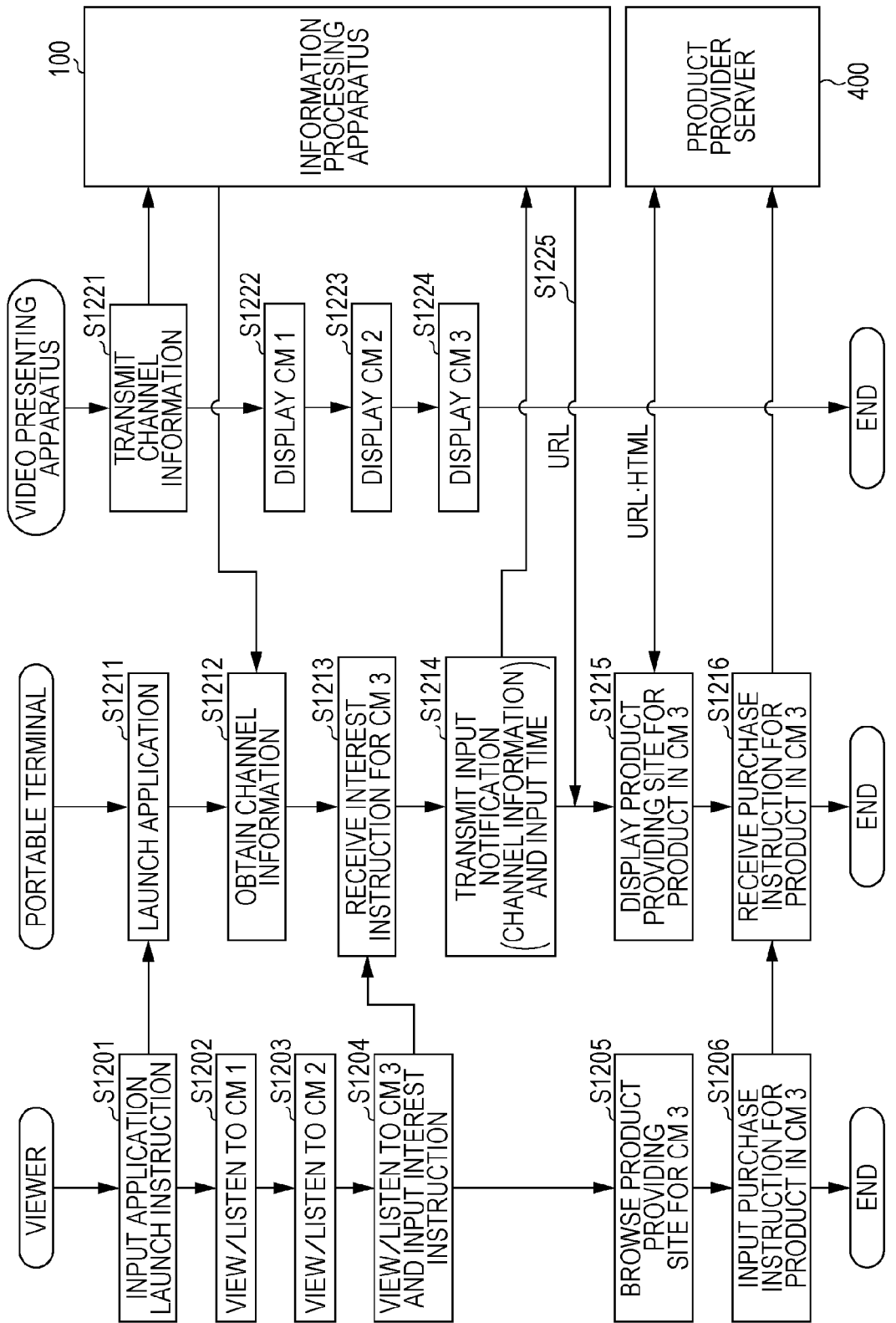
FIG. 16 is a sequence diagram illustrating one example of processing in a modification of the first embodiment.

Next, a description will be given of a modification of the first embodiment. This modification has a feature in that the viewer inputs an interest instruction by using the portable terminal 500, not the remote controller 300. FIG. 16 is a sequence diagram illustrating one example of processing in the modification of the first embodiment.

In this modification, it is assumed that an application is pre-installed in the portable terminal 500 in order for the viewer to input an interest instruction. It is also assumed that the information processing apparatus 100 manages the channel information currently set by each video presenting apparatus 200.

First, the viewer inputs an application launch instruction to the portable terminal 500 (S1201). Upon receiving the input application launch instruction, the portable terminal 500 launches an application (S1211).

The video presenting apparatus 200 transmits channel information to the information processing apparatus 100 (S1221). At this point, for example, each time the viewer changes the channel, the video presenting apparatus 200 may transmit, to the information processing apparatus 100, channel information indicating the changed channel.

The portable terminal 500 that has launched the application accesses the information processing apparatus 100 to obtain the channel information indicating the channel that is currently set by the video presenting apparatus 200 (S1212).

As described above, the information processing apparatus 100 manages the channel information of the video presenting apparatus 200, and the portable terminal 500 obtains the channel information of the video presenting apparatus 200 from the information processing apparatus 100. This makes it possible to minimize changes in the design of the video presenting apparatus 200.

That is, it is possible to conceive an arrangement in which the portable terminal 500 communicates with the video presenting apparatus 200 to directly obtain the channel information from the video presenting apparatus 200. In this case, however, a dedicated communication circuit or the like (for example, a communication circuit based on Bluetooth (registered trademark) or the like) for communicating with the portable terminal 500 needs to be added to the video presenting apparatus 200, which leads to an increase in the cost of the video presenting apparatus 200. There is also the possibility that a currently available video presenting apparatus 200 cannot be applied to the information providing system. Meanwhile, in recent years, the video presenting apparatuses 200 that are connectable to the Internet have come into widespread use.

Accordingly, the use of the above-described configuration allows any video presenting apparatus 200 that is connectable to the Internet to be applied to this information providing system, without adding another communication circuit for the portable terminal 500. Thus, the number of video presenting apparatuses 200 that can be applied to the information providing system increases, thus making it possible to put the information providing system into widespread use.

Since S1202 to S1204 are analogous to S1101 to S1103 in FIG. 13, detailed descriptions thereof are not given hereinafter. Since S1222 to S1224 are analogous to S1121 to S1123 in FIG. 13, detailed descriptions thereof are not given hereinafter.

In S1213, the portable terminal 500 receives the viewer's interest instruction for CM 3. Next, the portable terminal 500 transmits, to the information processing apparatus 100, an input notification including the channel information obtained in S1212 and the input time of the interest instruction (S1214).

Upon receiving the input notification, the information processing apparatus 100 transmits, to the portable terminal 500, the URL of the product providing site of the product provider that offers the product in CM 3 at the lowest price (S1225). Upon receiving the URL, the portable terminal 500 specifies the URL to access the product providing site to receive HTML data of the product providing site that offers the product in CM 3 and displays the product providing site (S1215).

When a viewer browses the product providing site that offers the product in CM 3 and decides to purchase the product (S1205), he or she inputs a purchase instruction for the product (S1206). The portable terminal 500 receives the input purchase instruction (S1216) and transmits a purchase request to the product provider server 400.

In this modification, the above-described application is an application for the viewer to input an interest instruction, but is not necessarily limited thereto. For example, the application may be an application for performing processes in S1213 to S1216, in addition to allowing the viewer to input an interest instruction.

Figure 17:
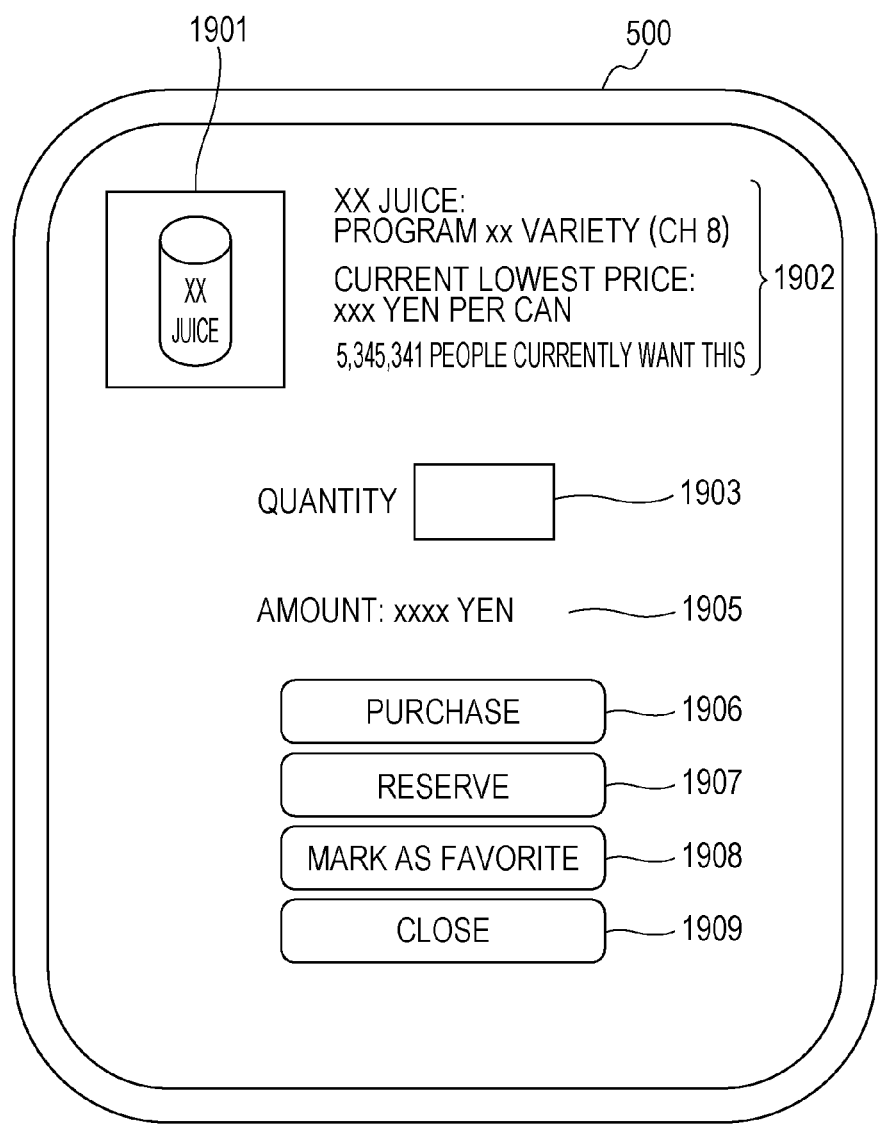
FIG. 17 is a view of one example of a display screen displayed on the portable terminal in the modification of the first embodiment.

FIG. 17 is a view of one example of a display screen displayed on the portable terminal 500 in the modification of the first embodiment. This display screen is a screen that the portable terminal 500 created using, for example, the HTML data transmitted from the product provider server 400 in S1215 in FIG. 16. The display screen has a product-image display section 1901, a product-information display section 1902, a quantity input section 1903, an amount-of-money display section 1905, a "purchase" button 1906, a "reserve" button 1907, a "mark as favorite" button 1908, and a "close" button 1909.

The product-image display section 1901 displays an image of a product presented on the video presenting apparatus 200 when an interest instruction was input, that is, displays an image of a product in which the viewer is interested. In this example, since the viewer inputs an interest instruction when XX juice was presented, an image of XX juice is displayed. The product-information display section 1902 displays information regarding the product displayed in the product-image display section 1901. In this example, the product-information display section 1902 displays the name of XX juice, the lowest price (the lowest cost) of XX juice, and the number of inputs of interest instructions for XX juice. The product-information display section 1902 also displays the program name of a program that the viewer was watching when he or she inputs the interest instruction and the channel information of a broadcast station that broadcasts the program.

For example, the portable terminal 500 may query the information processing apparatus 100, as needed, to obtain the product lowest price, the number of inputs of interest instructions, the program name, and the channel information of the program which are displayed in the product-image display section 1901 and the product-information display section 1902.

The quantity input section 1903 is a section in which the viewer inputs the quantity of the corresponding product to be purchased. Upon operation of the portable terminal 500, the portable terminal 500 displays the quantity, input by the viewer, in the quantity input section 1903. The amount-of-money display section 1905 displays an amount of money required to purchase the product. The portable terminal 500 determines the amount of money by multiplying the quantity input to the quantity input section 1903 by the product price (in this case, the lowest price displayed in the product-information display section 1902) and displays the amount of money in the amount-of-money display section 1905.

The "purchase" button 1906 is a button for receiving a product purchase instruction given by the viewer. When the viewer depresses the "purchase" button 1906, a purchase request is transmitted to the product provider server 400.

The "reserve" button 1907 is a button for the viewer to register a corresponding product in a reservation list. The viewer may have an interest in a corresponding product, but may put a hold on the purchase. In this case, the viewer depresses the "reserve" button 1907 to register the corresponding product in the reservation list. With this arrangement, when the viewer wants to purchase the product later, he or she can refer to the reservation list to browse the information regarding the product. As a result, the viewer can browse the information regarding the product, without inputting an interest instruction for the product again and accessing the product provider server 400.

When the viewer depresses the "reserve" button 1907, the portable terminal 500 registers the product information of the corresponding product and the product provider information in the reservation list. In this case, the reservation list may be stored in the portable terminal 500 or may be stored in the information processing apparatus 100. When an arrangement in which the reservation list is stored in the information processing apparatus 100 is employed, the portable terminal 500 may transmit the product information of a reserved product to the information processing apparatus 100.

The "mark as favorite" button 1908 is a button for registering, as a bookmark, the URL of a product providing site that the portable terminal 500 is currently accessing. Thus, the viewer can refer to the bookmark later to access the product providing site. The bookmark may be managed by the video presenting apparatus 200 or may be managed by the information processing apparatus 100.

The display screen illustrated in FIG. 17 may also be displayed on the video presenting apparatus 200. In this case, the video presenting apparatus 200 may also issue a reservation notification indicating that the product is reserved to a terminal apparatus, such as a personal computer or the portable terminal 500, possessed by the viewer. In this case, the video presenting apparatus 200 may transmit the reservation notification to the terminal apparatus, for example, via the information processing apparatus 100.

FIG. 18 is a view of one example of the display screen of the terminal apparatus which displays a reservation notification. As illustrated in FIG. 18, "XX juice reserved via the TV is set in the reservation list" is displayed, for example, at the lower portion of the display screen of the terminal apparatus to report that the viewer has reserved "XX juice" by using the video presenting apparatus 200.

When the viewer inputs a reservation-list display instruction with the terminal apparatus, the reservation list is displayed. FIG. 19 is a view of one example of a reservation-list display screen displayed by the terminal apparatus when the viewer inputs a reservation-list display instruction.

On the display screen illustrated in FIG. 19, a main-image display section 2601 is provided at the left half, and a reservation list 2602 is provided at the right half. The main-image display section 2601 displays a main-image of the terminal apparatus, and displays a browser screen in the example of FIG. 19. Product information of products that the viewer has reserved using the video presenting apparatus 200 is displayed in the reservation list 2602.

In the example in FIG. 19, since the viewer has reserved XX juice, XX lipstick, YY television, and ZZ detergent, product information of these four products are displayed in the reservation list 2602.

Figure 20:
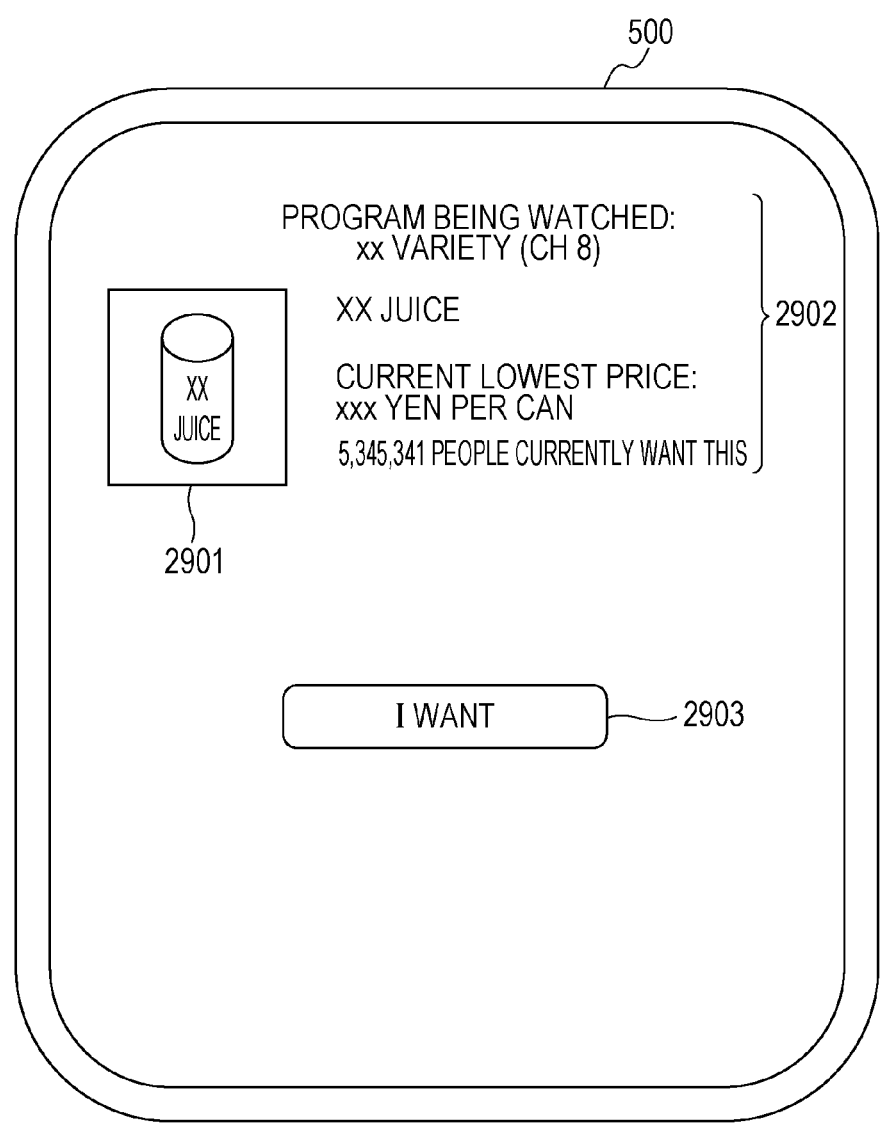
FIG. 20 is a view of one example of a display screen displayed on the portable terminal when the viewer inputs an interest instruction in the modification of the first embodiment.

FIG. 20 is a view of one example of a display screen displayed on the portable terminal 500 when the viewer inputs an interest instruction in the modification of the first embodiment. This display screen is displayed, for example, in S1213 in FIG. 16. This display screen has a product-image display section 2901, a product-information display section 2902, and an "I want" button 2903.

The product-image display section 2901 and the product-information display section 2902 are the same as those having the same names illustrated in FIG. 17. For example, the portable terminal 500 may query the information processing apparatus 100, as needed, to obtain information displayed on those sections.

Second Embodiment

An information providing system according to a second embodiment has a feature in that information regarding an actual store of a product provider is transmitted to the navigation apparatus 600 to present the product provider to the viewer. In the present embodiment, elements that are the same as or similar to those in the first embodiment are denoted by the same reference numerals, and descriptions thereof are not given hereinafter.

Figure 21:
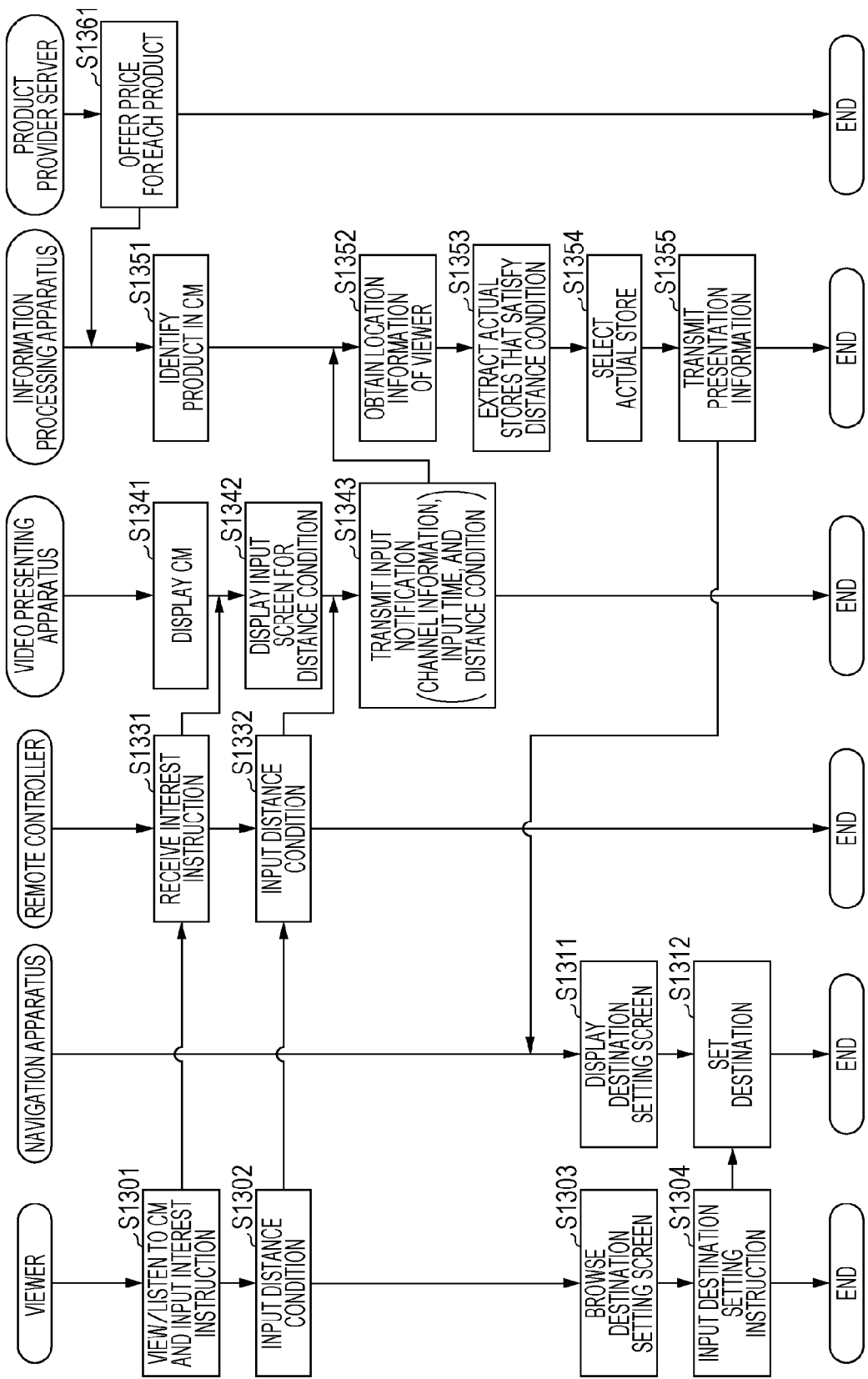
FIG. 21 is a sequence diagram illustrating one example of a flow of processing in an information providing system in a second embodiment.

FIG. 21 is a sequence diagram illustrating one example of a flow of processing in the information providing system in the second embodiment. Since S1301, S1331, S1341, S1351, are S1361 are analogous to S1001, S1011, S1021, S1031, and S1041 in FIG. 12, descriptions thereof are not given hereinafter.

Upon receiving, from the remote controller 300, a command indicating that an interest instruction is input, the video presenting apparatus 200 displays an input screen for a distance condition (S1342). The "distance condition" as used herein refers to, for example, the range of distance to an actual store which the viewer thinks he or she can actually come to buy the product. The distance condition may be input by, for example, a scheme for inputting a numerical value indicating a distance range or a scheme for inputting information, such as prefecture, city, town, village, and so on.

Next, the viewer sees the input screen for the distance condition and inputs the distance condition (S1302). Next, the remote controller 300 receives the input distance condition (S1332) and transmits a command indicating the distance condition to the video presenting apparatus 200.

Upon receiving the command indicating the distance condition, the video presenting apparatus 200 transmits an input notification to the information processing apparatus 100 (S1343). In this case, the input notification includes the distance condition, in addition to the channel information and the input time.

Upon receiving the input notification, the identifying unit 102 in the information processing apparatus 100 obtains the location information of the viewer in real space (S1352). At this point, the identifying unit 102 may use the location information of the video presenting apparatus 200 in real space as the location information of the viewer in real space. In this case, the identifying unit 102 may perform, for example, the following processing. First, the identifying unit 102 transmits a query notification for querying the video presenting apparatus 200 about the location information via the communication unit 120. Upon receiving the query notification, the video presenting apparatus 200 causes the GPS sensor 203 to obtain the location information of the video presenting apparatus 200 and transmits the obtained location information to the information processing apparatus 100. The identifying unit 102 then obtains the location information of the video presenting apparatus 200 via the communication unit 120. For example, when the video presenting apparatus 200 holds the location information thereof in advance, the video presenting apparatus 200 may transmit the location information held thereby to the information processing apparatus 100. In this case, the GPS sensor 203 may be omitted from the video presenting apparatus 200.

This, however, is merely one example, and the identifying unit 102 may use, for example, the location information of the portable terminal 500 carried by the viewer in real space as the location information of the viewer in real space. In this case, the identifying unit 102 may transmit, via the communication unit 120, a query notification for the location information of the portable terminal 500 carried by the viewer and may obtain the location information of the portable terminal 500.

Next, by using the distance condition included in the input notification, the selecting unit 103 in the information processing apparatus 100 extracts, from the product provider information table, product providers' actual stores located within a distance range indicated by the distance condition with respect to the current position of the viewer (S1353).

Next, the selecting unit 103 selects, from the actual stores extracted in S1353, an actual store of a product provider that offers the lowest price (S1354).

Next, the presenting unit 104 transmits, to the navigation apparatus 600, presentation information including product information of the product identified in S1351 and information regarding the actual store selected in S1354 (S1355). In this case, the presenting unit 104 may extract the location information (latitude and longitude) of the actual store and the address of the actual store by using the location information table illustrated in FIG. 8 and may use the extracted location information and address as the information regarding the actual store. In addition, the presenting unit 104 may insert an actual store name and a product provider name to which the actual store belongs into the information regarding the actual store. By referring to the viewer information table illustrated in FIG. 10, the presenting unit 104 may identify the communication address of the corresponding navigation apparatus 600.

Next, the navigation apparatus 600 receives the presentation information and displays a destination setting screen for setting, as a destination, the location information of the actual store included in the presentation information (S1311). Next, when the viewer browses the destination setting screen (S1303) and inputs a destination setting instruction (S1304), the navigation apparatus 600 sets the location information of the actual store as the destination (S1312). Thereafter, the navigation apparatus 600 guides the viewer to the actual store. When the presenting unit 104 transmits the presentation information in S1355, there may be a case in which the engine of a vehicle in which the navigation apparatus 600 is installed is not started up and a power source for the navigation apparatus 600 is turned off. In this case, the arrangement may also be such that, when the navigation apparatus 600 is turned on, the navigation apparatus 600 is made to issue a notification indicating that it is turned on, and the presenting unit 104 transmits the presentation information in response to the notification. FIG. 21 illustrates a case in which the destination setting screen is presented to the viewer, an input destination setting instruction is received, and the destination is set, but this is merely one example. For example, upon receiving the presentation information, the navigation apparatus 600 may automatically set, as a destination, the location information included in the presentation information.

As described above, according to the information providing method in the second embodiment, when the viewer inputs an interest instruction, presentation information including the location information of an actual store that offers, at the lowest price, a product presented on the video presenting apparatus 200 when the interest instruction was input is transmitted to the navigation apparatus 600. Thus, the viewer does not have to perform work for inputting the address or the like of an actual store to the navigation apparatus 600 to set the destination. This makes it possible to reduce the number of processing steps and the number of user operation steps with the navigation apparatus 600 during setting of the destination. In addition, it is easy to perform work for setting an actual store for the navigation apparatus 600 as a destination. Thus, even viewers who are slow to act can be motivated to go out to the actual store to purchase a product, making it possible to increase the number of customers who visit the actual store.

Third Embodiment

A third embodiment has a feature in that the video presenting apparatus 200 and the navigation apparatus 600 cooperate with each other to present a product provider's actual stores to the viewer. In the present embodiment, elements that are the same as or similar to those in the first and second embodiments are denoted by the same reference numerals, and descriptions thereof are not given hereinafter.

Figure 22:
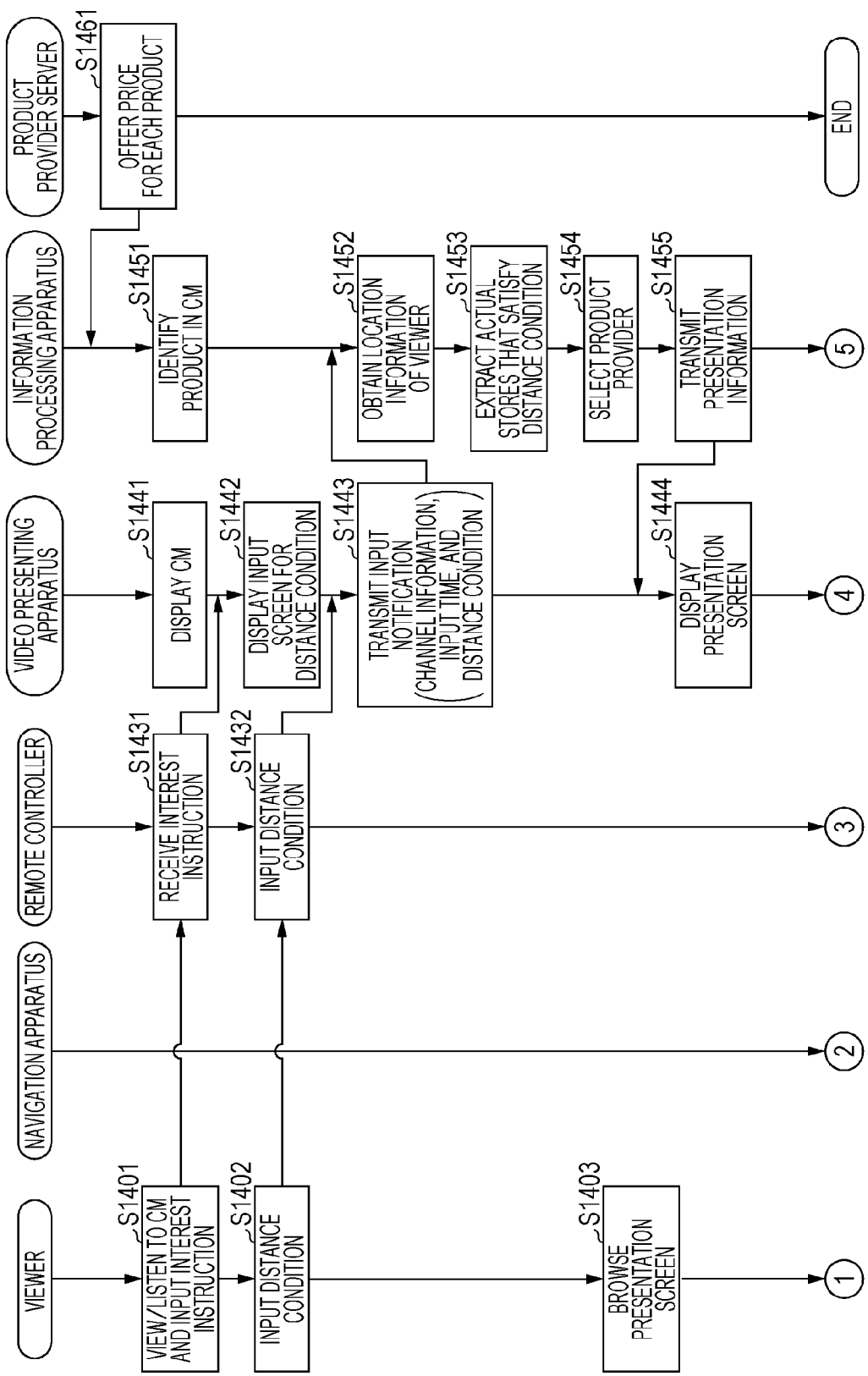
FIG. 22 is a sequence diagram illustrating one example of a flow of processing in an information providing system in a third embodiment.
Figure 23:
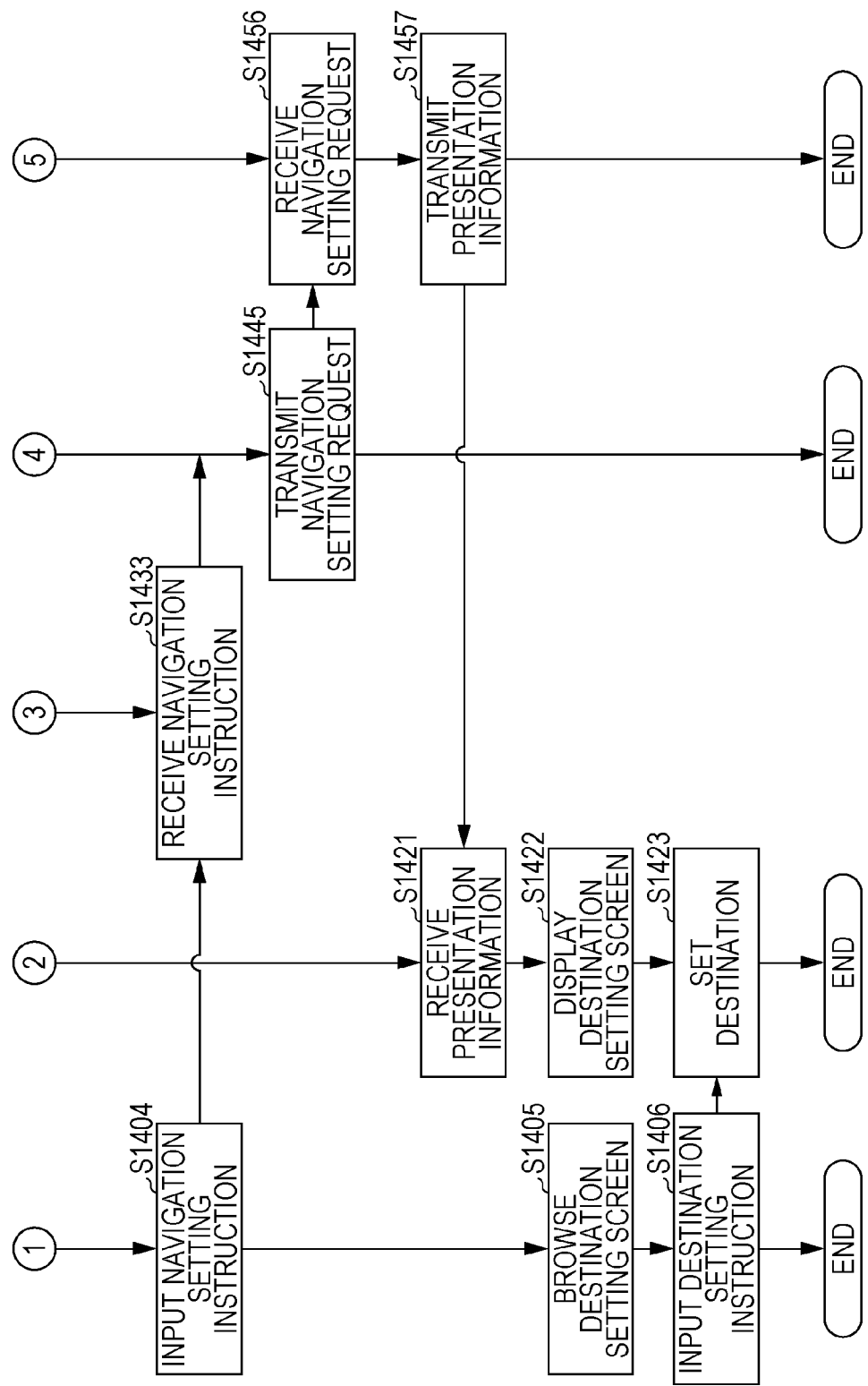
FIG. 23 is a sequence diagram illustrating one example of the flow of the processing in the information providing system in the third embodiment.

FIGS. 22 and 23 are sequence diagrams illustrating one example of a flow of processing in an information providing system in the third embodiment. Since S1401 and S1402 are analogous to S1301 and S1302 in FIG. 21, detailed descriptions thereof are not given hereinafter. Since S1431 and S1432 are analogous to S1331 and S1332 in FIG. 21, detailed descriptions thereof are not given hereinafter. Since S1441 to S1443 are analogous to S1341 to S1343 in FIG. 21, detailed descriptions thereof are not given hereinafter. Since S1451 to S1455 are analogous to S1351 to S1355 in FIG. 21, detailed descriptions are not given hereinafter. Since S1461 is analogous to S1361 in FIG. 21, a detailed description thereof is not given hereinafter.

In S1444, by using the presentation information transmitted from the information processing apparatus 100, the video presenting apparatus 200 displays a presentation screen. The presentation information in this case includes the product information of the product identified by the identifying unit 102 and the information regarding the actual store selected by the selecting unit 103, as described above in the second embodiment. The presentation screen is an image in which the product information of the identified product and the information regarding the selected actual store are associated with each other.

In S1403, the viewer browses the presentation screen presented on the video presenting apparatus 200.

Next, the viewer inputs a navigation setting instruction (S1404). Next, the remote controller 300 receives the navigation setting instruction (S1433) and transmits, to the video presenting apparatus 200, a command indicating that the navigation setting instruction was input. Upon receiving the command, the video presenting apparatus 200 transmits a navigation setting request to the information processing apparatus 100 (S1445). Upon receiving the navigation setting request, the information processing apparatus 100 transmits, to the navigation apparatus 600, the same presentation information as the presentation information transmitted to the video presenting apparatus 200 (S1457).

Upon receiving the presentation information (S1421), the navigation apparatus 600 displays the destination setting screen (S1422), as in S1311 in FIG. 21. Since S1405, S1406, and S1423 are analogous to S1303, S1304, and S1312 in FIG. 21, detailed descriptions thereof are not given hereinafter.

Figure 24:
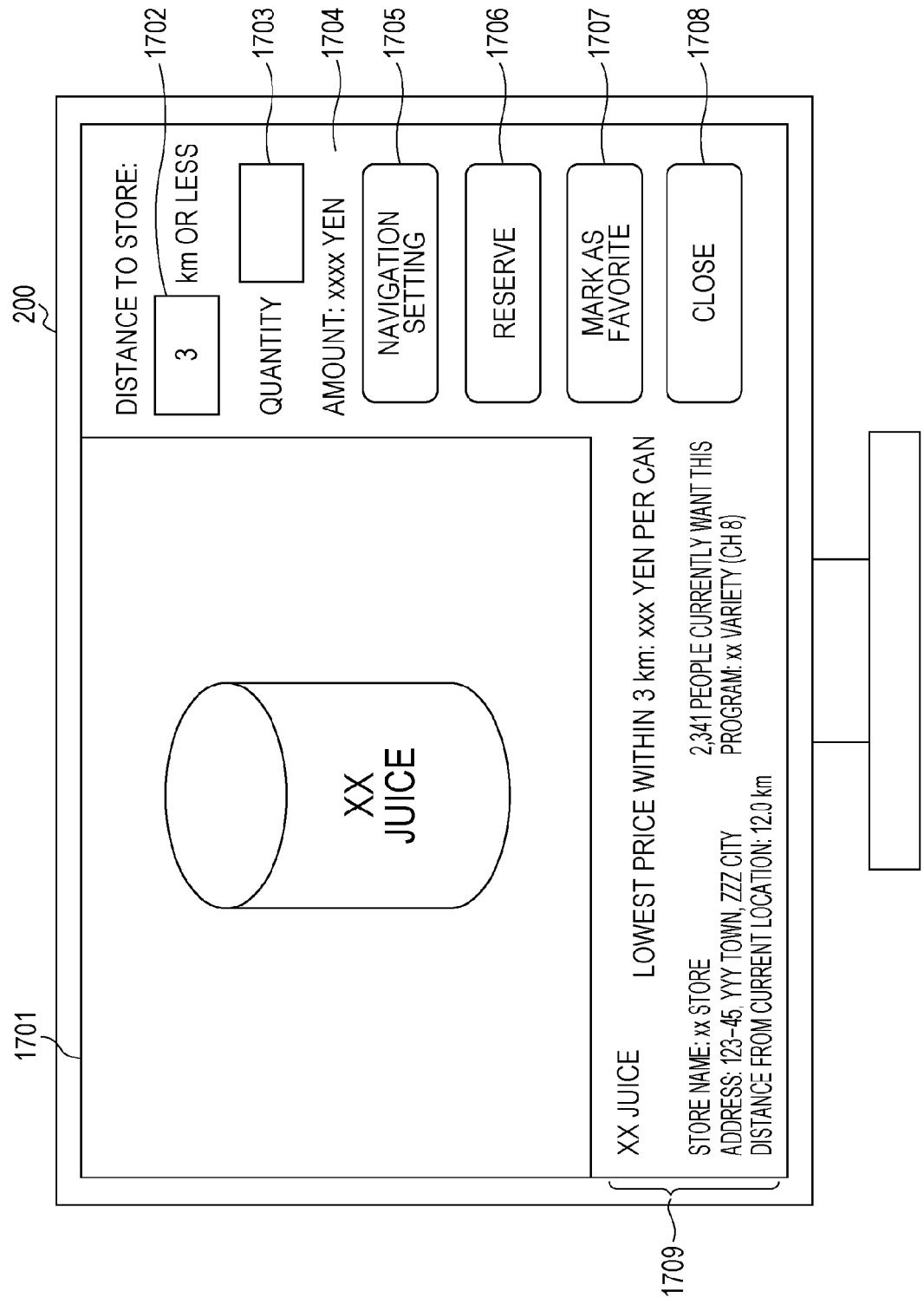
FIG. 24 is a view of one example of a presentation screen presented on the video presenting apparatus in the third embodiment.

FIG. 24 is a view of one example of the presentation screen presented on the video presenting apparatus 200 in the third embodiment. This presentation screen is, for example, a screen that the video presenting apparatus 200 has created using the presentation information transmitted from the information processing apparatus 100 in S1455 in FIG. 22. This presentation screen is displayed, for example, in S1444 in FIG. 22. This presentation screen has a product-image display section 1701, a distance display section 1702, a quantity display section 1703, an amount-of-money display section 1704, a "navigation setting" button 1705, a "reserve" button 1706, a "mark as favorite" button 1707, a "close" button 1708, and a product-information display section 1709.

In the third embodiment, since the actual store is presented to the viewer, the product-information display section 1709 displays information regarding the actual store that offers a corresponding product.

The product-image display section 1701 displays an image of the product in which the viewer is interested. Since the presentation image illustrated in FIG. 24 is an image displayed on the video presenting apparatus 200, the product-image display section 1701 displays video of a broadcast wave received by the video presenting apparatus 200, the video including the corresponding product.

The distance condition for an actual store to which the viewer thinks he or she can actually come is input in the distance display section 1702. In the example in FIG. 24, since 3 km is input as the distance condition, the information processing apparatus 100 selects an actual store that offers the corresponding product at the lowest price from actual stores located within 3 km from the location of the viewer.

The quantity display section 1703 and the amount-of-money display section 1704 are substantially the same as those having the same names illustrated in FIG. 17.

The "navigation setting" button 1705 is a button for transmitting the presentation information to the navigation apparatus 600. When the "navigation setting" button 1705 is selected through operation of the remote controller 300, the video presenting apparatus 200 transmits a navigation setting request to the information processing apparatus 100, and presentation information is transmitted from the information processing apparatus 100 to the navigation apparatus 600.

The "reserve" button 1706 is a button for the viewer to register the corresponding product in the reservation list, as in FIG. 17. When the viewer selects the "reserve" button 1706 by operating the remote controller 300, the video presenting apparatus 200 transmits, to the information processing apparatus 100, information indicating that the viewer has reserved the corresponding product, and the information processing apparatus 100 registers the product information of the corresponding product in the viewer's reservation list managed thereby. The reservation list may also be provided in the video presenting apparatus 200, not in the information processing apparatus 100.

The "mark as favorite" button 1707 is a button for registering, as a bookmark, a presentation screen that is currently displayed by the video presenting apparatus 200. Thus, the viewer can refer to the bookmark later to display the presentation screen on the video presenting apparatus 200. The bookmark may be managed by the video presenting apparatus 200 or may be managed by the information processing apparatus 100. The "close" button 1909 is a button for closing the presentation screen.

Figure 25:
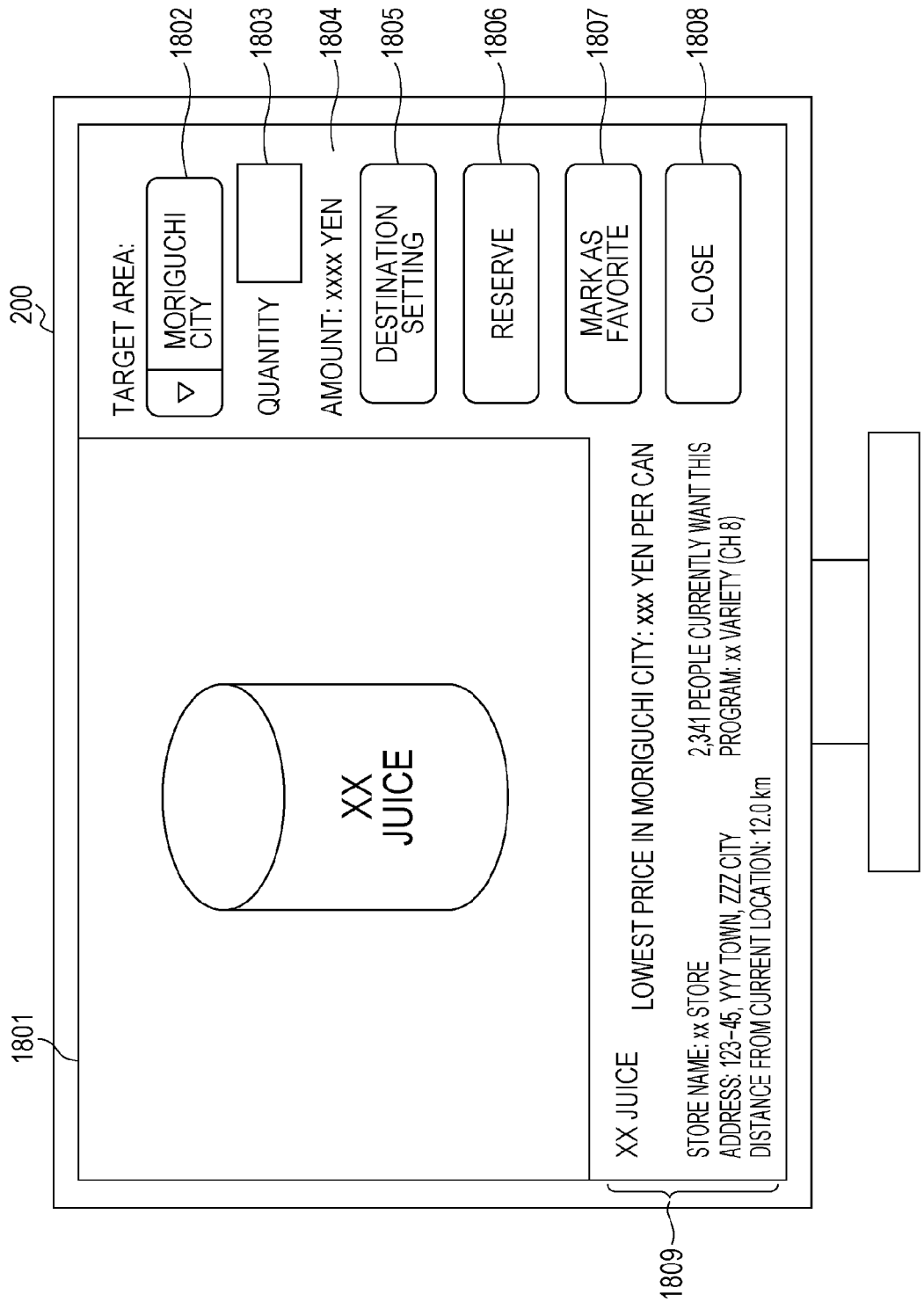
FIG. 25 is a view of a modification of the presentation screen illustrated in FIG. 24.

FIG. 25 is a view of a modification of the presentation screen illustrated in FIG. 24. Differences from FIG. 24 are that a target-area input section 1802 is provided instead of the distance display section 1702, and a "destination setting" button 1805 is provided instead of the "navigation setting" button 1705. A product-image display section 1801, a quantity display section 1803, an amount-of-money display section 1804, a "reserve" button 1806, a "mark as favorite" button 1807, and a "close" button 1808 are substantially the same as the sections and the buttons having the same names illustrated in FIG. 24.

In FIG. 25, the viewer inputs a region name indicating a region in real space, not a numerical value, as a distance condition. Country, prefecture, city, ward, town, village, and so on can be used as the region. When the region name is input to the target-area input section 1802, the information processing apparatus 100 selects an actual store that offers a corresponding product at the lowest price from actual stores in the region indicated by the input region name.

In the example in FIG. 25, since "Moriguchi City" is input to the target-area input section 1802, an actual store that offers the corresponding product at the lowest price is selected in Moriguchi City. Thus, "lowest price in Moriguchi City: xxx yen" is shown in a product-information display section 1809.

The "destination setting" button 1805 is a button for causing the navigation apparatus 600 to set, as a destination, the location information of the actual store displayed in the product-information display section 1809. When the viewer selects the "destination setting" button 1805 by operating the remote controller 300, the video presenting apparatus 200 transmits a destination setting request to the information processing apparatus 100, and presentation information is transmitted from the information processing apparatus 100 to the navigation apparatus 600. Upon receiving the presentation information, the navigation apparatus 600 sets, as a destination, the location information of the actual store included in the presentation information.

Since the presentation screen illustrated in FIG. 25 has the "destination setting" button 1805, as described above, the viewer can set the location information of the actual store as the destination of the navigation apparatus, without operating the navigation apparatus 600.

Figure 26:
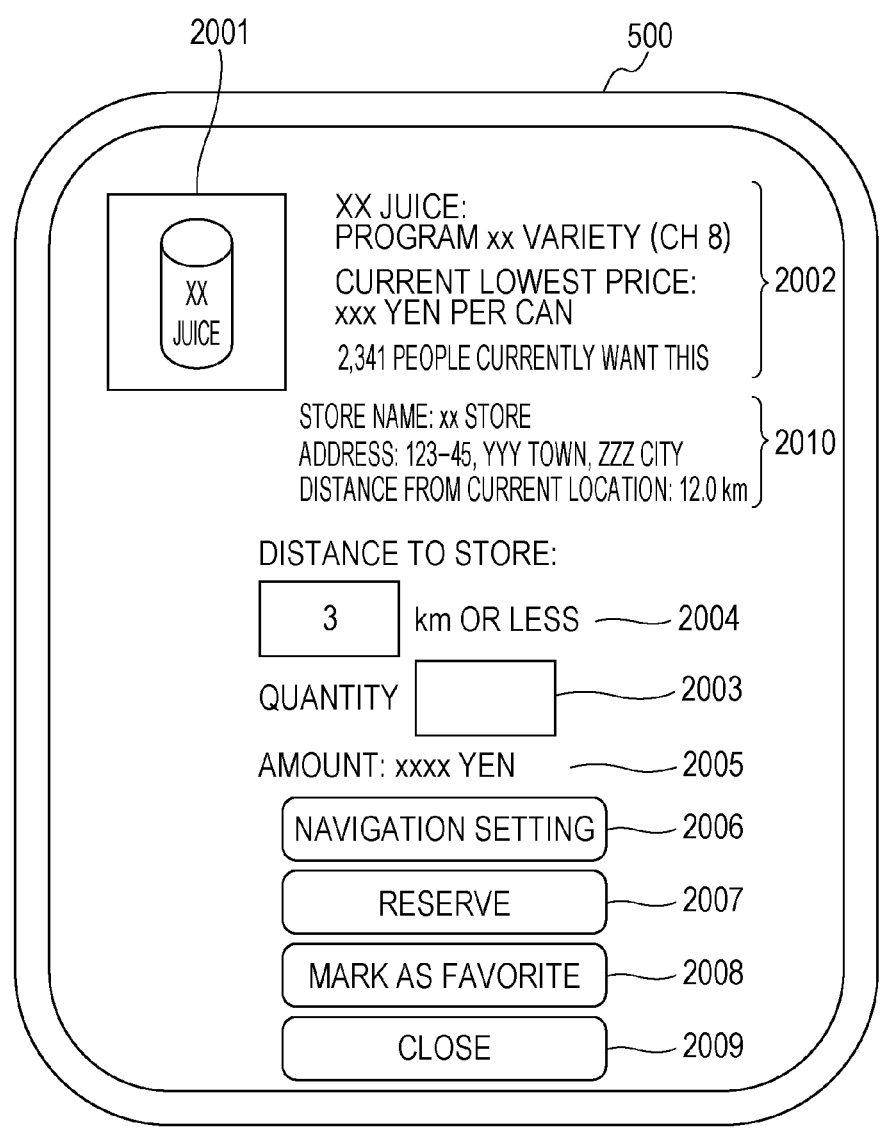
FIG. 26 is a view of yet another modification of the presentation screen illustrated in FIG. 24.

FIG. 26 is a view of yet another modification of the presentation screen illustrated in FIG. 24. Although the viewer uses the remote controller 300 to input the interest instruction in the flowcharts in FIGS. 22 and 23, he or she may also use the portable terminal 500 to input the interest instruction. In this case, the presentation screen may be displayed on the portable terminal 500, not on the video presenting apparatus 200. The presentation screen illustrated in FIG. 26 is displayed on the portable terminal 500 when this arrangement is employed.

The presentation screen illustrated in FIG. 26 is basically the same as the display screen illustrated in FIG. 17, but is different therefrom in that a "navigation setting" button 2006 is provided instead of the "purchase" button 1906, and a distance input section 2004 and a store-information display section 2010 of an actual store are added. A product-image display section 2001, a product-information display section 2002, a quantity input section 2003, an amount-of-money display section 2005, a "reserve" button 2007, a "mark as favorite" button 2008, and a "close" button 2009 are substantially the same as the sections and buttons having the same names illustrated in FIG. 17.

The "navigation setting" button 2006 is a button for transmitting the presentation information to the navigation apparatus 600. When the "navigation setting" button 2006 is selected through operation of the portable terminal 500, the portable terminal 500 transmits a navigation setting request to the information processing apparatus 100, and presentation information is transmitted from the information processing apparatus 100 to the navigation apparatus 600.

The distance condition for an actual store to which the viewer thinks he or she can actually come is input in the distance input section 2004. Details of the distance input section 2004 are substantially the same as those of the distance display section 1702 illustrated in FIG. 24.

The store-information display section 2010 displays information regarding an actual store that offers a corresponding product.

Figure 27:
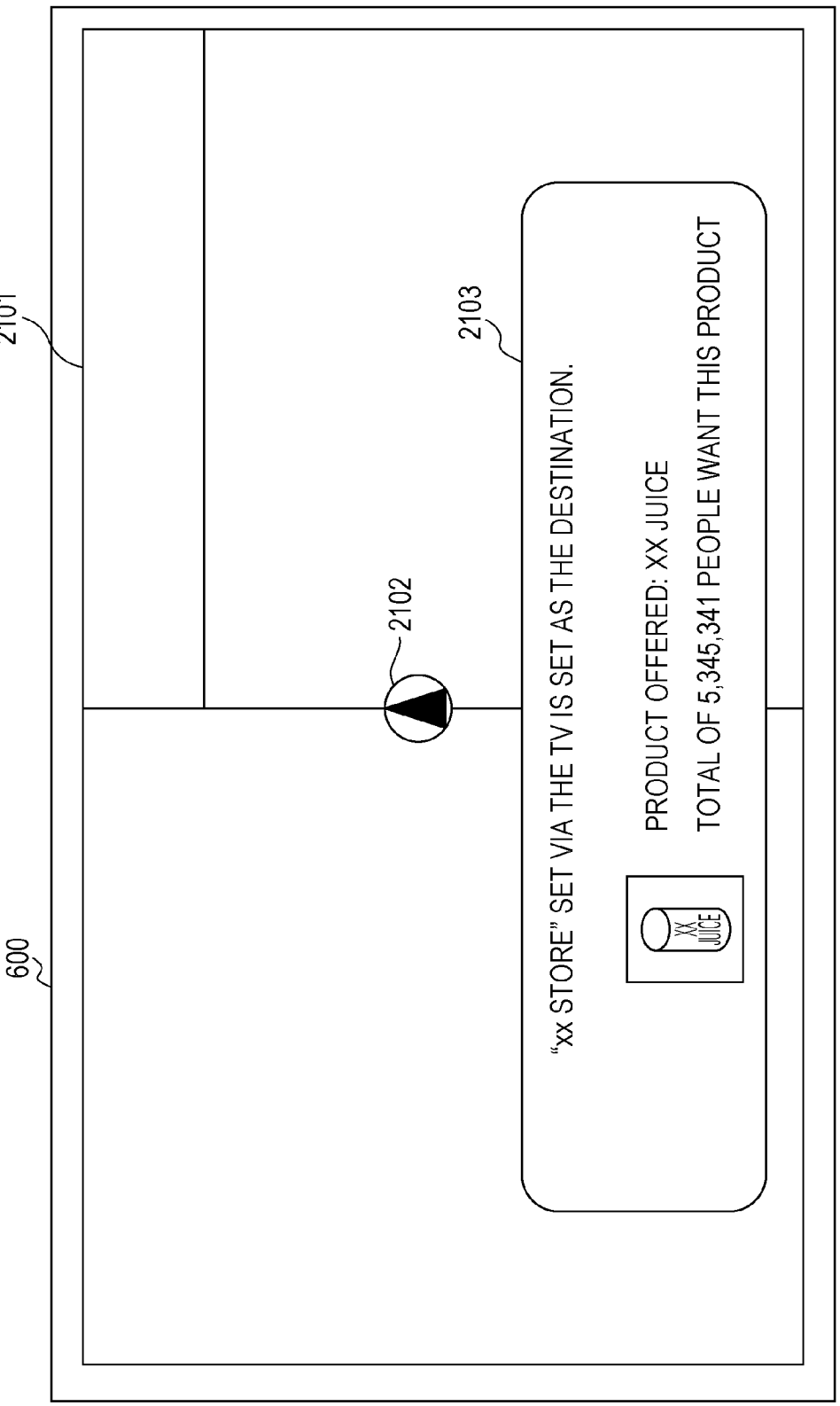
FIG. 27 illustrates one example of a display screen displayed on the navigation apparatus.

FIG. 27 illustrates one example of the display screen displayed on the navigation apparatus 600. The display screen in FIG. 27 is displayed when an arrangement in which the location information of an actual store is automatically set as a destination when the navigation apparatus 600 is turned on. This setting is performed, for example, when the viewer selects the "destination setting" button 1805 in FIG. 25.

As illustrated in FIG. 27, the display screen has a navigation screen 2101. On the navigation screen 2101, a marker 2102 indicating the current location of the navigation apparatus 600 is displayed on a map image in an overlapping manner. Also, on the navigation screen 2101, an actual-store display section 2103 that displays information regarding the actual store set as a destination is displayed in an overlapping manner.

In the example in FIG. 27, the actual-store display section 2103 shows text "xx store set via the TV is set as the destination". Thus, upon turning on the navigation apparatus 600, the viewer can check at a glance that the destination is set to the actual store of a product provider that offers the product for which an interest instruction was input via the video presenting apparatus 200.

Also, since the actual-store display section 2103 displays an image of the product and a product name, the viewer can check at a glance the product for which an interest instruction was input. In addition, the actual-store display section 2103 displays the number of inputs of all viewers' interest instructions for the corresponding product. Thus, the viewer can check at a glance to what degree this product is popular.

Figure 28:
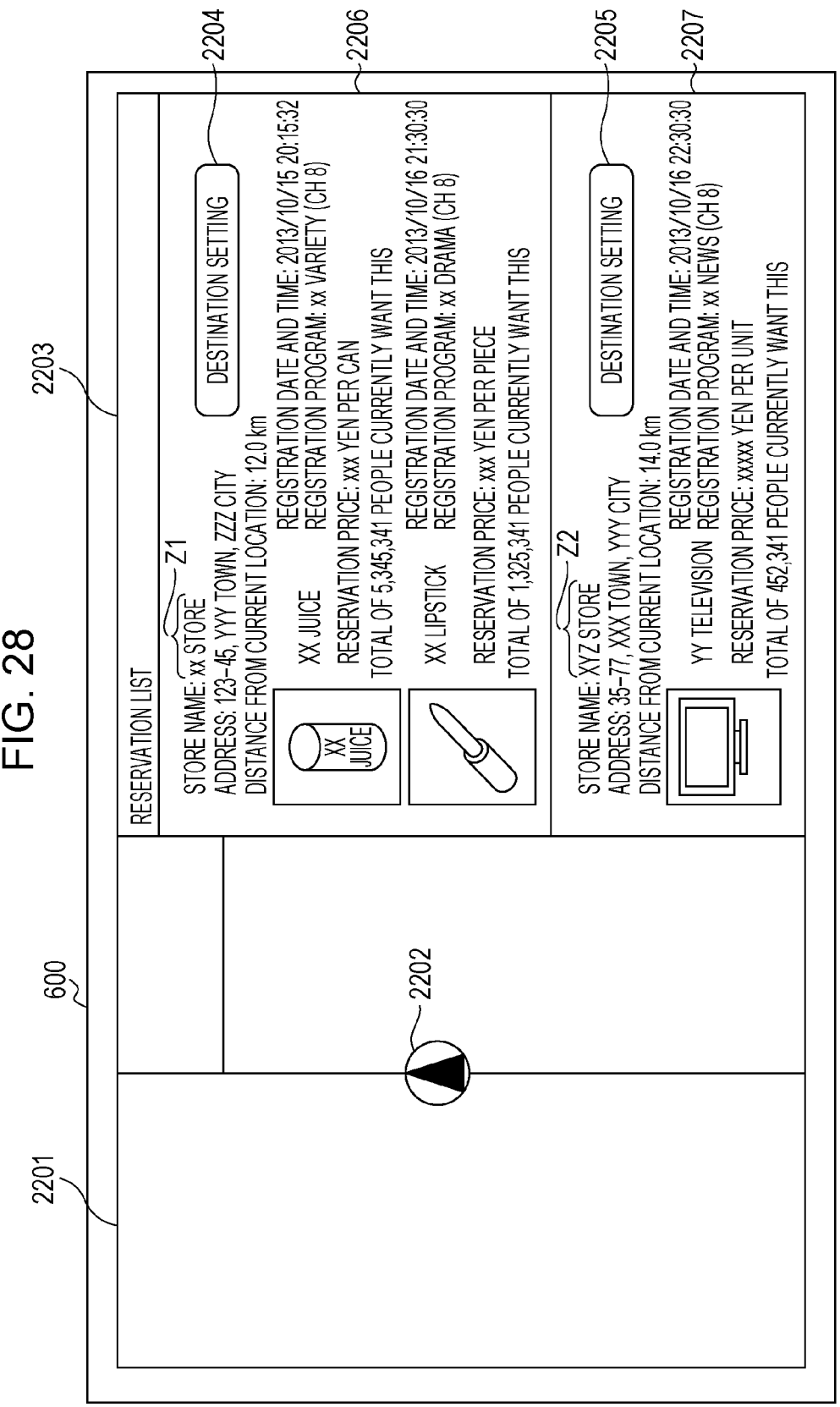
FIG. 28 illustrates one example of a destination setting screen displayed by the navigation apparatus.

FIG. 28 illustrates one example of the destination setting screen displayed by the navigation apparatus 600. The destination setting screen illustrated in FIG. 28 is displayed when an arrangement in which the viewer is prompted so as to set a destination and then sets a destination is employed. This setting is performed, for example, when the viewer selects the "navigation setting" button 1705 in FIG. 24 or the "navigation setting" button 2006 in FIG. 26.

A reservation list 2203 displays the product information of products registered in the reservation list. The products displayed in the reservation list 2203 are, for example, products registered in the reservation list when the viewer selected the "reserve" button 1706 FIG. 24 or the "reserve" button 2007 in FIG. 26.

In the example in FIG. 28, three products are reserved, and two of the products are provided at an actual store Z1, and the remaining product is provided at an actual store Z2. Thus, a destination setting section 2206 for the actual store Z1 and a destination setting section 2207 for the actual store Z2 are displayed in the reservation list 2203.

The destination setting sections 2206 are 2207 have "destination setting" buttons 2204 and 2205, respectively. When the viewer sets the location information of the actual store Z1 as a destination, he or she selects the "destination setting" button 2204. When the "destination setting" button 2204 is selected, the navigation apparatus 600 sets the location information of the actual store Z1 as a destination. Also, when the viewer sets the location information of the actual store Z2 as a destination, the "destination setting" button 2205 is selected. When the "destination setting" button 2205 is selected, the navigation apparatus 600 sets the location information of the actual store Z2 as a destination.

Figure 29:
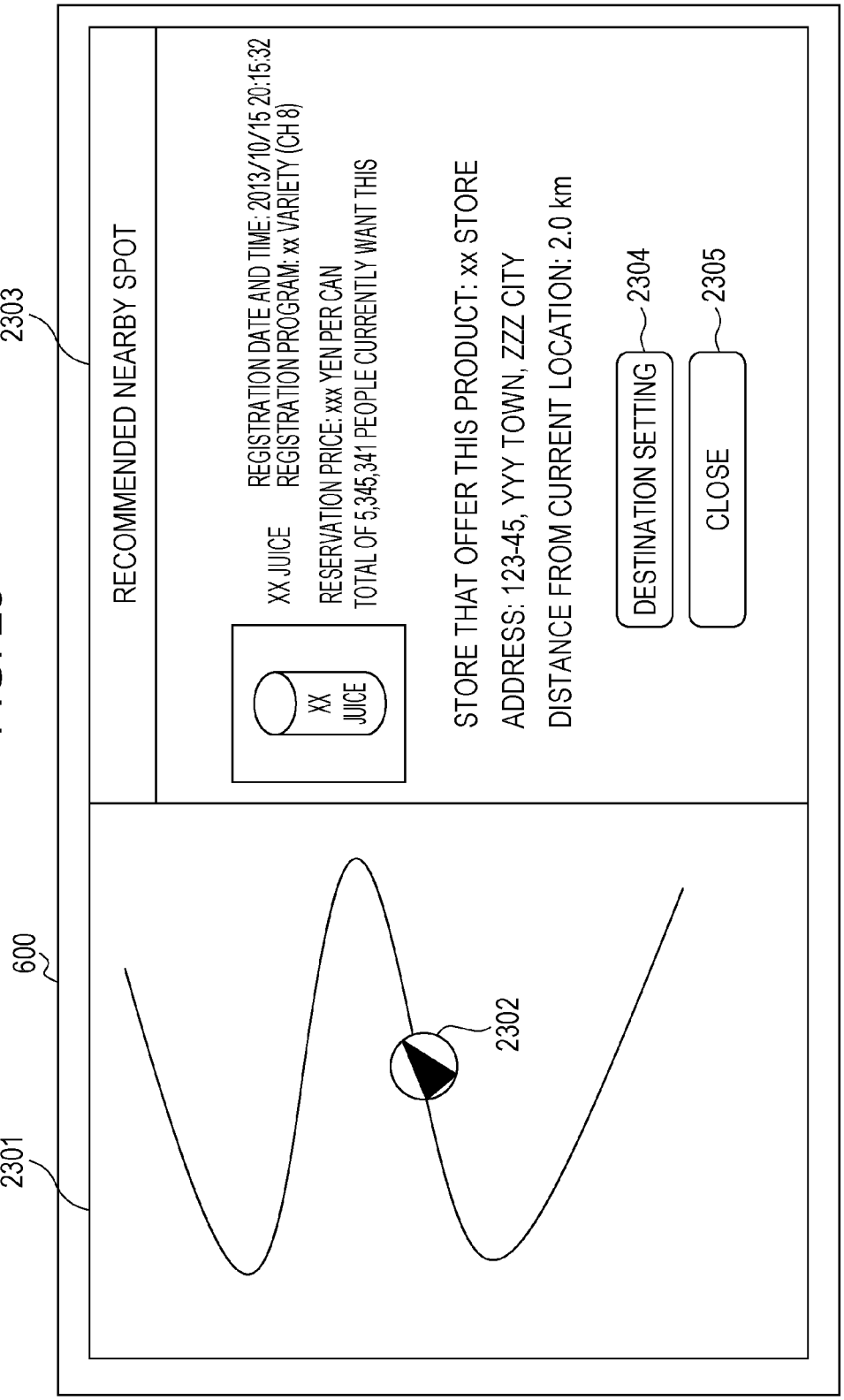
FIG. 29 illustrates another example of the destination setting screen displayed on the navigation apparatus.

FIG. 29 illustrates another example of the destination setting screen displayed on the navigation apparatus 600. The destination setting screen in FIG. 29 is displayed, for example, when a vehicle driven by the viewer travels in the vicinity of an actual store that offers a reserved product. On the destination setting screen illustrated in FIG. 29, a navigation screen 2301 is provided at the left half, and a product-information display section 2303 is provided at the right half.

On the navigation screen 2301, a marker 2302 indicating the current location of the navigation apparatus 600 is displayed on a map image in an overlapping manner. The product-information display section 2303 shows, for example, a title "recommended nearby spot" at its upper portion to prompt the setting of a destination.

The product-information display section 2303 displays the product information of a product reserved by the viewer and actual store information of an actual store that offers the product. The actual store information displays the distance from the current location to the actual store, in addition to the name and the address of the actual store. This makes it possible to motivate the viewer to come to the actual store because he or she has come near the actual store.

Also, a "destination setting" button 2304 and a "close" button 2305 are provided at the lower side of the product-information display section 2303. When the viewer selects the "destination setting" button 2304, the navigation apparatus 600 sets, as a destination, the actual store displayed in the product-information display section 2303. When the "close" button 2305 is selected, the navigation apparatus 600 clears the product-information display section 2303.

Figure 30:
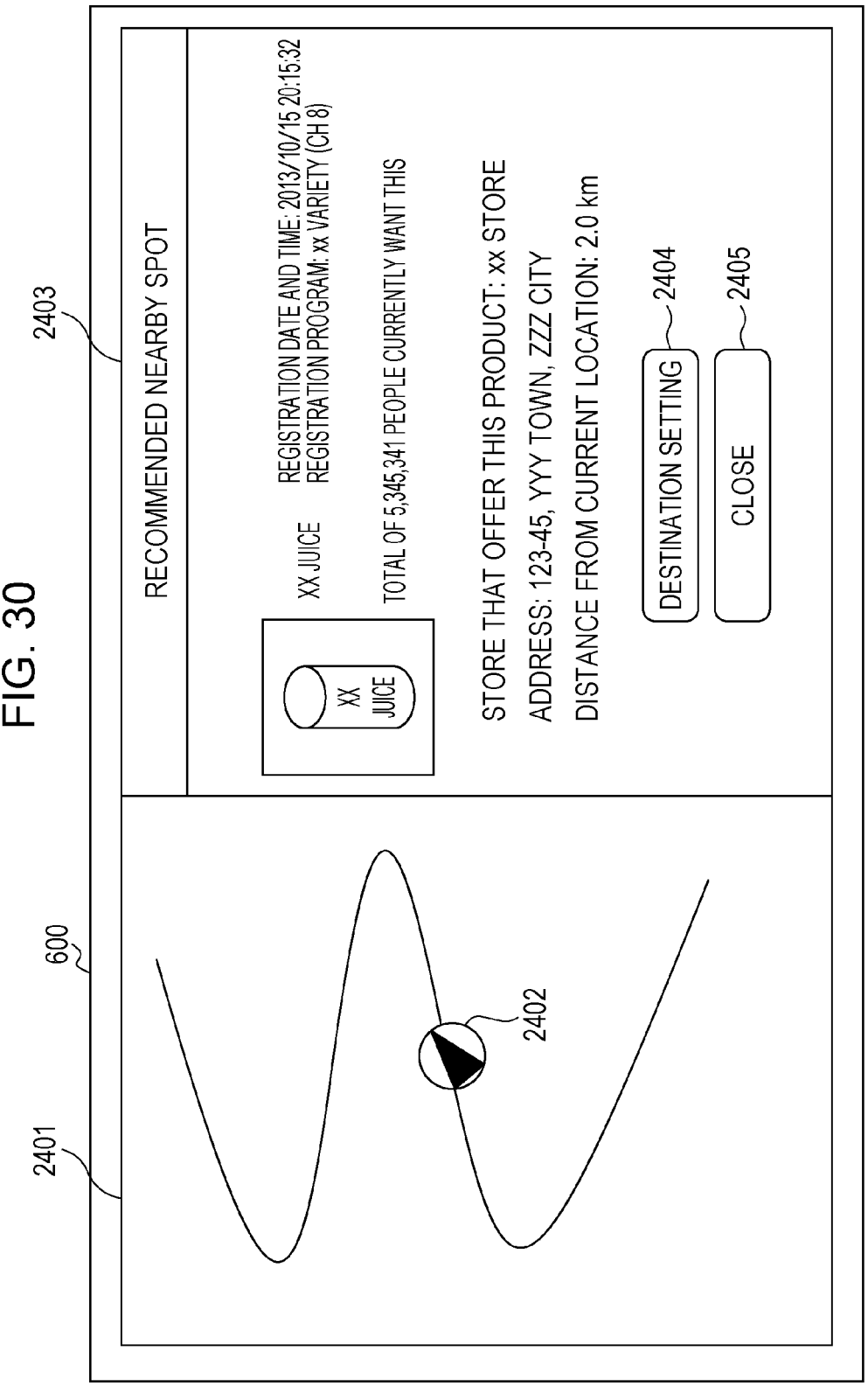
FIG. 30 illustrates yet another example of the destination setting screen displayed on the navigation apparatus.

FIG. 30 illustrates yet another example of the destination setting screen displayed on the navigation apparatus 600. The destination setting screen in FIG. 30 is displayed, for example, when the viewer has input an interest instruction and the vehicle travels in the vicinity of an actual store that offers a product for which neither reservation nor navigation setting has been made.

A difference from FIG. 29 is that the product price is not displayed. A navigation screen 2401, a product-information display section 2403, a "destination setting" button 2404, and a "close" button 2405 are substantially the same as the section and buttons having the same names illustrated in FIG. 29. When no product is reserved, displaying the price of a product may reduce the viewer's willingness to purchase the product, and thus, in FIG. 30, the price of the product is not displayed.

In the second and third embodiments, since the viewer inputs a distance condition, the information processing apparatus 100 may generate a bidding display screen considering the distance condition and transmit the bidding display screen to the product provider server 400. FIG. 31 illustrates one example of the bidding display screen considering the distance condition. A difference from FIG. 9 is that a "distance from store" field and a "depression count" field are further provided. A distance condition input by the viewer is registered in the "distance from store" field. The number of inputs of interest instructions, the number corresponding to a distance condition input by the viewer, is registered in the "depression count" field. For example, for QQ washing machine, the bidding display screen shows that the number of viewers who have input interest instructions for a distance condition of 1 km or less is 41. Also, for QQ washing machine, the bidding display screen shows that the number of viewers who have input interest instructions for a distance condition of 2 km or less is 341. As the lowest price, the lowest price corresponding to the depression count is registered. For example, the bidding display screen shows that, when the depression count is 41, company A offers QQ washing machine for 175,000 yen, and when the depression count is 341, company A offers QQ washing machine for 137,000 yen.

Since this bidding presentation screen displays a depression count corresponding to the distance condition, each product provider can check viewers' willingness to purchase each product. For example, when the depression count for a distance of 2 km or more is large, it can be determined that the viewers do not place much importance on the distance to the product providing place to purchase a corresponding product and the viewers' willingness to purchase the product is high. Also, when the depression count for a distance of 1 km or less is large, it can be determined that the viewer's place importance on the distance to the product providing place to purchase the corresponding product.

The present disclosure is useful for, for example, technologies that provide video presenting apparatuses, such as televisions, with various services.

What is claimed is:

1. An information providing method for an information providing system that provides information to a viewer of a video presenting apparatus, the method comprising:

receiving from the video presenting apparatus an input notification indicating an interest instruction, the interest instruction being input at the video presenting apparatus by the viewer when video was presented on the video presenting apparatus, the video including product information in which the viewer expressed interest;

identifying a product in which the viewer expressed interest, by using the input notification;

counting the number of viewers who expressed interest in the identified product, by using a result of the identifying;

obtaining first offered prices for the identified product of a first product provider and second offered prices for the identified product of a second product provider, each of the first offered prices and each of the second offered prices corresponding to the number of viewers counted in the counting, and registering first product provider information including the first offered prices and second product provider information including the second offered prices;

selecting one of the first product provider and the second product provider, by using the first product provider information, the second product information, and the counted number of the viewers; and causing a navigation apparatus of the viewer to present to the viewer the product provider information of the selected one product provider; and the product information of the identified product, wherein, the first product provider information includes first location information indicating, in real space, a first product providing place of the first product provider, and the second product provider information includes second location information indicating, in real space, a second product providing place of the second product provider; and wherein, in the presenting, when the product provider information of the selected one product provider and the product information is presented to the navigation apparatus, the navigation apparatus sets, as a destination for the viewer, a location that exists in the real space and that is indicated by the location information included in product provider information for the selected product provider.

2. The information providing method according to claim 1, wherein, in the selecting, one product provider that offers the identified product at the lowest price is selected from the first product provider and the second product provider.

3. The information providing method according to claim 1, further comprising:

presenting to a first server of the first product provider and to a second server of the second product provider the counted number of viewers for the identified product.

4. The information providing method according to claim 3, wherein the first offered prices and the second offered prices include values that differ depending on the number of viewers who have expressed interest in the identified product; and in the selecting, the one a product provider that presents a lowest offered price with respect to the counted number of viewers is selected.

5. The information providing method according to claim 1, further comprising:

identifying a location of the video presenting apparatus or the viewer in the real space, wherein in the selecting, the one product provider who provides the identified product at a place where a distance from the identified location is within a certain distance range is selected.

6. The information providing method according to claim 5, wherein the received input notification further includes a distance range to the place where the product is provided, the distance range being input by the viewer, and wherein in the selecting, the one product provider within the distance range is selected.

7. The information providing method according to claim 1, wherein the navigation apparatus of the viewer comprises is the video presenting apparatus;

the first product provider information includes first location information indicating, in a communications network, a first location of a first product providing site via which the first product provider allows the viewer to purchase the identified product, and the second product provider information includes second location information indicating, in a communications network, a second location of a second product providing site via which the second product provider allows the viewer to purchase the identified product; and in the presenting, when the product provider information of the selected one product provider and the product information is presented to the video presenting apparatus, the video presenting apparatus uses the location information for the selected one product provider to access the product providing site for the selected one product provider.

8. The information providing method according to claim 1, further comprising:

receiving broadcast waves of one or more channels, wherein in the identifying, channel information of a broadcast wave received by the video presenting apparatus is obtained when the interest instruction was input, and the product, in which the viewer expresses interest, is identified by using the obtained channel information and the received broadcast wave and using the video presented on the video presenting apparatus when the interest instruction was input.

9. The information providing method according to claim 1, wherein the video presenting apparatus or the navigation apparatus receives the interest instruction input by the viewer; and the input notification is received from the video presenting apparatus or the navigation apparatus that has received the interest instruction.

10. The information providing method according to claim 1, wherein at least one of the receiving, the identifying, the counting, the registering, the selecting and the causing is performed by a processor.

11. A navigation apparatus used in an information providing system including an information processing apparatus that provides information to a viewer of a video presenting apparatus, the navigation apparatus comprising:

an operator that receives input of an interest instruction from a viewer when video including product information in which the viewer expressed interest was presented;

a first receiver that receives, from the information processing apparatus through a communications network, channel information of a channel corresponding to a video which the video presenting apparatus is presenting, the information processing apparatus obtaining the channel information from the video presenting apparatus through the communications network, the received channel information being inserted into an input notification of the interest instruction;

a transmitter that transmits the input notification, into which the received channel information is inserted, to the information processing apparatus;

a second receiver that receives, from the information processing apparatus through the communications network, presentation information for causing a display of the navigation apparatus to display product information of a product in which the viewer expressed interest and product provider information of a product provider that offers the product; and a display processor that causes the display to display the product information and the product provider information based on the presentation information received by the second receiver, wherein, the product provider information includes location information indicating, in real space, a product providing place of the product provider; and wherein, when the product information and the product provider information are displayed, the navigation apparatus sets, as a destination for the viewer, a location that exists in the real space and that is indicated by the location information included in the product provider information.

12. A method for controlling a navigation apparatus used in an information providing system including an information processing apparatus that provides information to a viewer of a video presenting apparatus, the method causing a computer of the navigation apparatus to execute:

receiving input of an interest instruction from a viewer when video including product information in which the viewer expressed an interest was presented;

receiving, from the information processing apparatus through a communications network, channel information of a channel corresponding to a video which the video presenting apparatus is presenting, the information processing apparatus obtaining the channel information from the video presenting apparatus through the communications network;

inserting the received channel information into an input notification indicating the interest instruction to the information processing apparatus;

transmitting the input notification, into which the received channel information is inserted, to the information processing apparatus;

receiving, from the information processing apparatus through the communications network, presentation information for causing a display of the navigation apparatus to display product information of a product in which the viewer expressed interest and product provider information of a product provider that offers the product; and causing the display to display the product information and the product provider information based on the received presentation information;

wherein, the product provider information includes location information indicating, in real space, a product providing place of the product provider and wherein, when the product information and the product provider information are displayed at the navigation apparatus, a location is set in the navigation apparatus, as a destination for the viewer, the location exists in the real space and is indicated by location information included in the product provider information.

13. A computer-readable non-transitory tangible recording medium recording a program executed by a navigation apparatus used in an information providing system including an information processing apparatus that provides information to a viewer of a video presenting apparatus, the program causing a computer of the navigation apparatus to execute:

receiving input of an interest instruction from a viewer when video including product information in which the viewer expressed interest was presented;

receiving, from the information processing apparatus through a communications network, channel information of a channel corresponding to a video which the video presenting apparatus is presenting, the information processing apparatus obtaining the channel information from the video presenting apparatus through the communications network;

inserting the received channel information into an input notification indicating the interest instruction to the information processing apparatus;

transmitting the input notification, into which the received channel information is inserted, to the information processing apparatus;

receiving, from the information processing apparatus through the communications network, presentation information for causing a display of the navigation apparatus to display product information of a product in which the viewer expressed interest and product provider information of a product provider that offers the product; and causing the display to display the product information and the product provider information based on the received presentation information, wherein, the product provider information includes location information that indicates, in real space, a product providing place of the product provider and wherein, when the product information and the product provider information are displayed at the navigation apparatus, the program further causes the computer to set, as a destination for the viewer, a location that exists in the real space and that is indicated by location information included in the product provider information.

14. An information providing system comprising:

an information processing apparatus that provides information to a viewer of a video presenting apparatus that obtains broadcast waves and that presents video; and a navigation apparatus, wherein the information processing apparatus:

receives from the video presenting apparatus an input notification indicating an interest instruction, the interest instruction being input at the video presenting apparatus by the viewer when video was presented on the video presenting apparatus, the video including product information in which the viewer expressed interest;

identifies a product in which the viewer expressed interest, by using the input notification;

counts the number of viewers who expressed interest in the identified product, by using a result of the identifying;

obtains first offered prices for the identified product of a first product provider and second offered prices for the identified product of a second product provider, each of the first offered prices and each of the second offered prices corresponding to the number of viewers counted in the counting, and registering first product provider information including the first offered prices and second product provider information including the second offered prices; and selects one of the first product provider and the second product provider, by using the first product provider information, the second product information, and the counted number of the viewers, and wherein the navigation apparatus presents the product provider information of the selected one product provider and the product information of the identified product in an associated manner, wherein, the first product provider information includes first location information indicating, in real space, a first product providing place of the first product provider, and the second product provider information includes second location information indicating, in real space, a second product providing place of the second product provider; and wherein, in the presenting, when the product provider information of the selected one product provider and the product information is presented to the navigation apparatus, the navigation apparatus sets, as a destination for the viewer, a location that exists in the real space and that is indicated by the location information included in product provider information for the selected product provider.

* * * * *